(12) United States Patent
Yoshida et al.

(10) Patent No.: US 11,897,303 B2
(45) Date of Patent: Feb. 13, 2024

(54) VEHICLE CONTROL DEVICE, VEHICLE CONTROL METHOD, AND VEHICLE CONTROL SYSTEM

(71) Applicant: HITACHI ASTEMO, LTD., Ibaraki (JP)

(72) Inventors: Yuki Yoshida, Ibaraki (JP); Ryusuke Hirao, Ibaraki (JP); Nobuyuki Ichimaru, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 8 days.

(21) Appl. No.: 17/797,250

(22) PCT Filed: Feb. 4, 2021

(86) PCT No.: PCT/JP2021/004038
§ 371 (c)(1),
(2) Date: Aug. 3, 2022

(87) PCT Pub. No.: WO2021/157640
PCT Pub. Date: Aug. 12, 2021

(65) Prior Publication Data
US 2023/0061807 A1 Mar. 2, 2023

(30) Foreign Application Priority Data
Feb. 7, 2020 (JP) .................. 2020-019544

(51) Int. Cl.
*B60G 17/0195* (2006.01)
*B60G 17/016* (2006.01)

(52) U.S. Cl.
CPC ....... *B60G 17/0195* (2013.01); *B60G 17/016* (2013.01); *B60G 2400/82* (2013.01); *B60G 2500/10* (2013.01); *B60G 2800/21* (2013.01)

(58) Field of Classification Search
CPC ............ B60G 2500/10; B60G 17/0195; B60G 17/016; B60G 2400/822; B60G 2400/82; B60G 2800/21; B60G 2600/182
(Continued)

(56) References Cited

U.S. PATENT DOCUMENTS 6,298,294 B1 * 10/2001 Murata ................ B60G 17/018
280/5.515
7,680,573 B2 * 3/2010 Ogawa ................ B60G 17/08
280/788

(Continued)

FOREIGN PATENT DOCUMENTS

JP 2005-104171 A 4/2005
JP 2015-051719 A 3/2015
(Continued)

OTHER PUBLICATIONS

International Search Report dated Apr. 20, 2021 for WO 2021/157640 A1 (4 pages).

*Primary Examiner* — Paul N Dickson
*Assistant Examiner* — Caitlin Anne Miller
(74) *Attorney, Agent, or Firm* — Venjuris, P.C.

(57) ABSTRACT

A vehicle control device includes a vertical VSE, a riding comfort control logic, a planar VSE, a steering stability control logic, a command limiting unit, a control command selection unit. The command limiting unit acquires specifications related to a traveling of a vehicle such as, for example, a slip rate and a four-wheel independent braking/driving force control flag through a CAN. The command limiting unit limits a variable range of a damping force generated by a suspension device provided between a vehicle body and wheels of the vehicle based on the specifications related to the traveling of the vehicle to obtain a first command value. The command limiting unit outputs the (Continued)

obtained first command value to the control command selection unit.

9 Claims, 15 Drawing Sheets

(58) Field of Classification Search
USPC .................... 180/197, 282; 280/5.515, 5.512
See application file for complete search history.

(56) References Cited

U.S. PATENT DOCUMENTS

| | | | |
|---|---|---|---|
| 9,855,813 B2 * | 1/2018 | Mohamed | B60G 17/08 |
| 2016/0159187 A1 | 6/2016 | Mohamed | |
| 2018/0361816 A1 * | 12/2018 | Ohno | B60G 17/0165 |
| 2019/0308481 A1 * | 10/2019 | Kabasawa | G01P 15/125 |
| 2021/0291606 A1 * | 9/2021 | Kanda | B60G 17/06 |

FOREIGN PATENT DOCUMENTS

| | | | |
|---|---|---|---|
| JP | 2015051719 A * | 3/2015 | |
| JP | 2015-155214 A | 8/2015 | |

\* cited by examiner

*FIG. 5*

|  | SLIP RATE SR | | |
|---|---|---|---|
|  | SR<S1 | S1≦SR<S2 | S2≦SR |
| FOUR-WHEEL INDEPENDENT BRAKING/DRIVING FORCE CONTROL FLAG OFF | NO LIMIT | LIMITED ACCORDING TO SLIP RATE | MAXIMUM LIMIT AMOUNT |
| FOUR-WHEEL INDEPENDENT BRAKING/DRIVING FORCE CONTROL FLAG ON | MAXIMUM LIMIT AMOUNT | MAXIMUM LIMIT AMOUNT | MAXIMUM LIMIT AMOUNT |

|  | FRONT/REAR ACCELERATION G | | |
|---|---|---|---|
|  | G<G1 | G1≦G<G2 | G2≦G |
| FOUR-WHEEL INDEPENDENT BRAKING/DRIVING FORCE CONTROL FLAG OFF | NO LIMIT | LIMITED ACCORDING TO FRONT/REAR ACCELERATION | MAXIMUM LIMIT AMOUNT |
| FOUR-WHEEL INDEPENDENT BRAKING/DRIVING FORCE CONTROL FLAG ON | MAXIMUM LIMIT AMOUNT | MAXIMUM LIMIT AMOUNT | MAXIMUM LIMIT AMOUNT |

FIG. 15

| | ENGINE TORQUE (T) OR BRAKE FLUID PRESSURE (P) | | |
|---|---|---|---|
| | ACCELERATION:T<T1<br>DECELERATION:P<P1 | ACCELERATION:T1≦T<T1<br>DECELERATION:P1≦P<P1 | ACCELERATION:T2≦T<br>DECELERATION:P2≦P |
| FOUR-WHEEL INDEPENDENT BRAKING/DRIVING FORCE CONTROL FLAG OFF | NO LIMIT | LIMITED ACCORDING TO ENGINE TORQUE OR BRAKE FLUID PRESSURE | MAXIMUM LIMIT AMOUNT |
| FOUR-WHEEL INDEPENDENT BRAKING/DRIVING FORCE CONTROL FLAG ON | MAXIMUM LIMIT AMOUNT | MAXIMUM LIMIT AMOUNT | MAXIMUM LIMIT AMOUNT |

FIG. 16

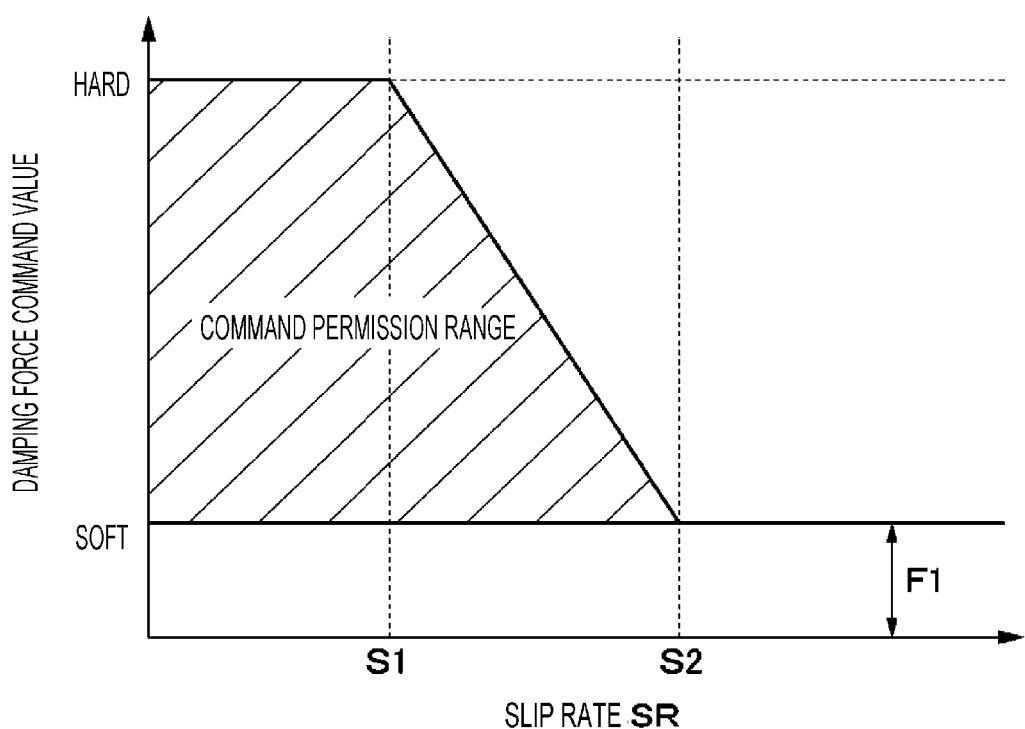

VEHICLE CONTROL DEVICE, VEHICLE CONTROL METHOD, AND VEHICLE CONTROL SYSTEM

CROSS REFERENCE TO RELATED APPLICATIONS

This application is a national phase of PCT application No. PCT/JP2021/004038, filed on 4 Feb. 2021, which claims priority from Japanese patent application No. 2020-019544, filed on 7 Feb. 2020, all of which are incorporated herein by reference.

TECHNICAL FIELD

The present disclosure relates to a vehicle control device, a vehicle control method, and a vehicle control system.

BACKGROUND

Various vehicle control devices are provided in the related art. For example, the technology disclosed in Patent Document 1 is known as one of the vehicle control devices. The vehicle control device disclosed in Patent Document 1 estimates a vertical motion by extracting the wheel speed caused by the vertical motion from a wheel speed signal, and adjusts the damping force of a damping force variable shock absorber according to the estimated vertical motion. In addition, Patent Document 1 discloses that when a decrease in the estimation accuracy of a stroke speed of the damping force variable shock absorber is detected, the damping force control amount becomes larger as the slip ratio of the wheel becomes larger.

PRIOR ART DOCUMENT

Patent Document

Patent Document 1: Japanese Patent Laid-Open Publication No. 2015-155214

SUMMARY OF THE INVENTION

Problems to be Solved

In the vehicle control device disclosed in Patent Document 1, when a decrease in the estimation accuracy of the stroke speed is detected, the damping force is controlled according to the slip ratio. Thus, when the decrease in estimation accuracy is not detected, the damping force is not controlled according to the slip ratio. Therefore, in the vehicle control device disclosed in Patent Document 1, there is a possibility that the intervention of the damping force control suitable for the road surface condition on which a vehicle travels may be delayed, and the riding comfort and steering stability may be deteriorated.

An embodiment of the present disclosure is to provide a vehicle control device, a vehicle control method, and a vehicle control system capable of suppressing a delay in intervention of damping force control suitable for a road surface condition on which a vehicle travels, thereby improving riding comfort and steering stability.

Means to Solve the Problems

According to an embodiment of the present disclosure, provided is a vehicle control device including a control unit that performs a calculation based on input information and outputs a calculation result. The control unit acquires specifications related to the traveling of a vehicle, limits a variable range of a damping force generated by a damping force generating device provided between a vehicle body and a wheel of the vehicle based on the acquired specifications related to the traveling of the vehicle, thereby obtaining a damping force control command, and outputs the obtained damping force control command.

According to an embodiment of the present disclosure, provided is a vehicle control method that includes acquiring specifications related to the traveling of a vehicle, limiting a variable range of a damping force generated by a damping force generating device provided between a vehicle body and a wheel of the vehicle based on the acquired specifications related to the traveling of the vehicle, thereby obtaining a damping force control command, and outputting the obtained damping force control command.

According to an embodiment of the present disclosure, a vehicle control system includes a damping force generating device provided between a vehicle body and a wheel of a vehicle, and a controller that acquires specifications related to the traveling of the vehicle, limits a variable range of a damping force generated by the damping force generating device based on the acquired specifications related to the traveling of the vehicle, thereby obtaining a damping force control command, and outputs the obtained damping force control command.

Effect of the Invention

An embodiment of the present disclosure may suppress a delay in intervention of damping force control suitable for a road surface condition on which a vehicle travels, thereby improving riding comfort and steering stability.

BRIEF DESCRIPTION OF THE DRAWINGS

FIG. 5 is a diagram illustrating a relationship of the limit of a command permission range with a slip ratio and a braking/driving force control flag according to the first embodiment.

FIG. 15 is a diagram illustrating a relationship of the limit of a command permission range with the engine torque, the brake fluid pressure, and a braking/driving force control flag according to the third embodiment.

FIG. 16 is a diagram illustrating a relationship between a slip ratio and a command permission range according to a fourth embodiment.

DETAILED DESCRIPTION TO EXECUTE THE INVENTION

Hereinafter, with reference to the accompanying drawings, detailed descriptions will be made on a case where a vehicle control device, a vehicle control method, and a vehicle control system according to an embodiment of the present disclosure are applied to a four-wheeled vehicle.

Figure 1:
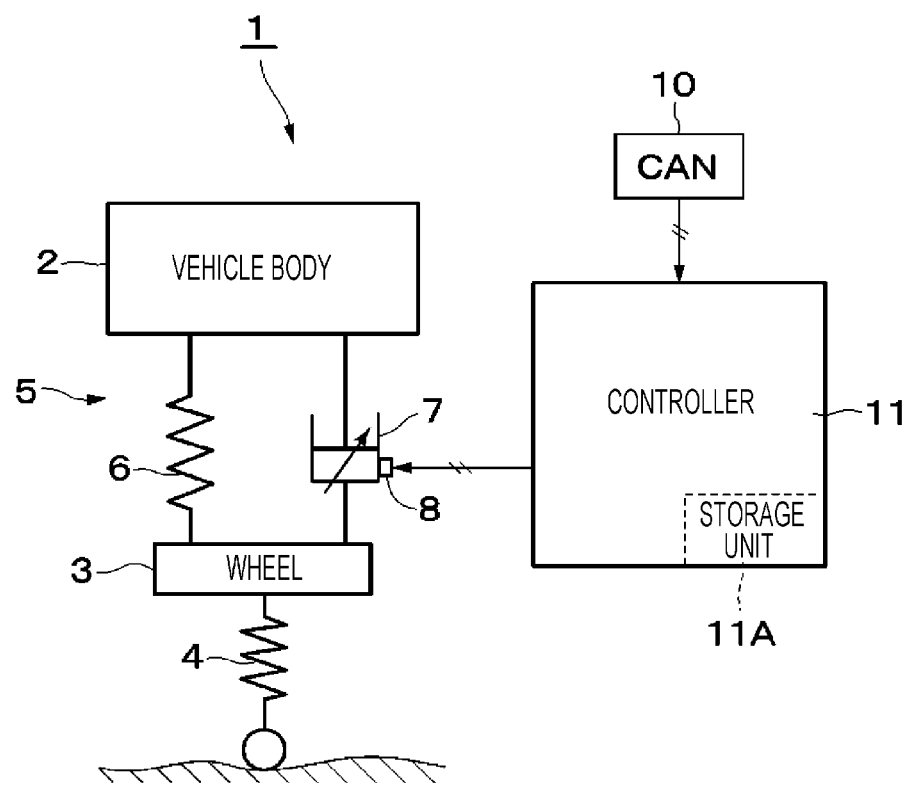
FIG. 1 is a diagram schematically illustrating a vehicle control system according to first to fourth embodiments.

FIG. 1 illustrates a vehicle control system 1 according to the embodiment. The vehicle control system 1 includes a suspension device 5 that constitutes a damping force generating device, and a controller 11 that constitutes a vehicle control device. In FIG. 1, for example, left and right front wheels and left and right rear wheels (hereinafter, collectively referred to as wheels 3) are provided on the lower side of a vehicle body 2 constituting the body of the vehicle. The wheel 3 includes a tire 4, and the tire 4 acts as a spring that absorbs fine irregularities on a road surface.

The suspension device 5 is provided between the vehicle body 2 and the wheels 3 of the vehicle. The suspension device 5 includes a suspension spring 6 (hereinafter, referred to as a spring 6) and a damping force adjusting shock absorber (hereinafter, referred to as a variable damper 7) provided between the vehicle body 2 and the wheel 3 in parallel with the spring 6.

FIG. 1 illustrates a case where a set of suspension devices 5 is provided between the vehicle body 2 and the wheel 3. However, the suspension device 5 is provided independently between four wheels 3 and the vehicle body 2, for example, in a total of four sets, and only one of the sets is schematically illustrated in FIG. 1.

Here, the variable damper 7 of the suspension device 5 is configured by using a damping force adjusting type hydraulic shock absorber provided between the vehicle body 2 and the wheel 3. The variable damper 7 is provided with a damping force variable actuator 8 including a damping force adjusting valve in order to continuously adjust the characteristic of the generated damping force (i.e., damping fore characteristics) from a hard characteristic to a soft characteristic. The damping force variable actuator 8 does not necessarily have to be configured to continuously adjust the damping force characteristics, and may be capable of adjusting the damping force in a plurality of steps of, for example, two or more steps. Further, the variable damper 7 may be a pressure control type or a flow rate control type. The variable damper 7 may be of a type that controls the viscosity, such as a magneto-viscous fluid or an electro-viscous fluid.

The controller 11 constitutes a vehicle control device. The controller 11 is configured by, for example, a microcomputer as a control device for controlling the damping characteristic of the variable damper 7. The controller 11 is connected to, for example, a controller area network (CAN) 10 which is a line network needed for data communication. The controller 11 acquires specifications related to the traveling of the vehicle through the CAN 10. At this time, the specifications related to the traveling of the vehicle include, for example, a wheel speed, a slip ratio, a front/rear acceleration, an engine torque, a brake fluid pressure, a road surface friction coefficient, and a four-wheel independent braking/driving force control flag. The output side of the controller 11 is connected to the damping force variable actuator 8 of the variable damper 7.

Further, the controller 11 has a storage unit 11A including a ROM, a RAM, and a non-volatile memory. Various programs, information (vehicle information), and data for controlling the variable damper 7 are stored in the storage unit 11A of the controller 11.

Figure 2:
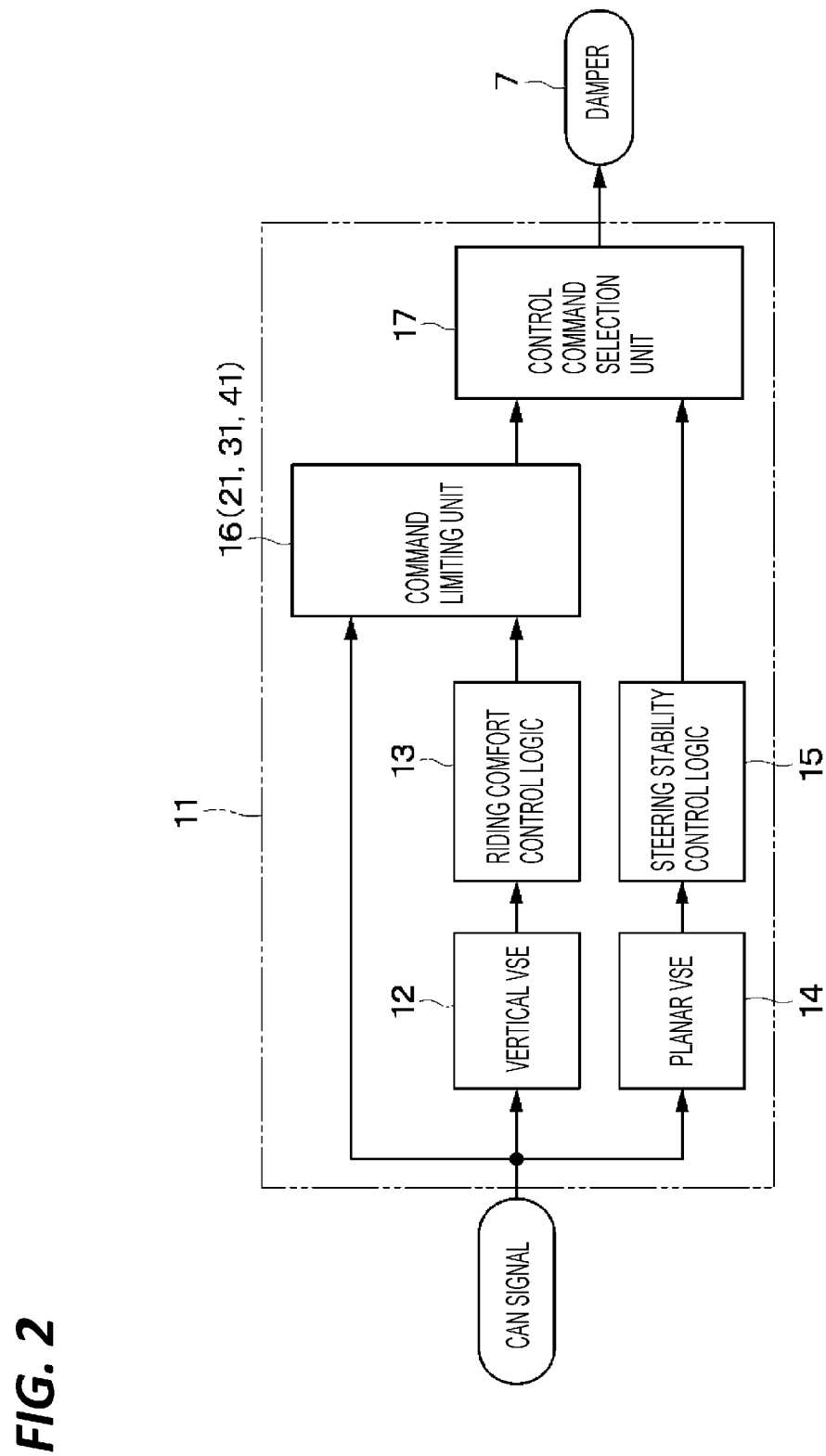
FIG. 2 is a control block diagram illustrating a controller in FIG. 1.

As illustrated in FIG. 2, the controller 11 includes a vertical VSE 12, a riding comfort control logic 13, a planar VSE 14, a steering stability control logic 15, a command limiting unit 16, and a control command selection unit 17.

The vertical VSE 12 performs a vehicle state estimation in the vertical direction. The vertical VSE 12 is configured in the same manner as, for example, a traveling state estimation unit disclosed in Patent Document 1. The vertical VSE 12 acquires the wheel speed from the CAN signal propagating in the CAN 10. The vertical VSE 12 estimates the vertical state of the vehicle body 2 from the change in wheel speed. Specifically, the vertical VSE 12 estimates the stroke speed, bounce rate, roll rate, pitch rate, and spring speed of each wheel based on the wheel speed. The vertical VSE 12 acquires the wheel speed, steering angle, vehicle body lateral speed, and actual yaw rate from the CAN signal, and estimates the stroke speed of each wheel using the elements.

The riding comfort control logic 13 calculates a command value to the variable damper 7 (force generation mechanism) based on the stroke speed and the spring speed of each wheel. The riding comfort control logic 13 outputs a damping force command value for reducing vertical vibration on the spring from the stroke speed and the spring speed, for example, based on the skyhook control law. At this time, the damping force command value is a riding comfort control logic command value.

The planar VSE 14 performs a vehicle state estimation in the plane direction. The planar VSE 14 acquires the wheel speed, steering angle, vehicle body lateral speed, and actual yaw rate from the CAN signal propagating in the CAN 10, and estimates lateral acceleration using the elements. The steering stability control logic 15 outputs a second command value for improving the steering stability of the vehicle based on the lateral acceleration. The steering stability control logic 15 calculates a second command value such that the damping force characteristic of the variable damper 7 becomes harder, for example, as the lateral acceleration increases. At this time, the second command value is the steering stability control logic command value.

Figure 3:
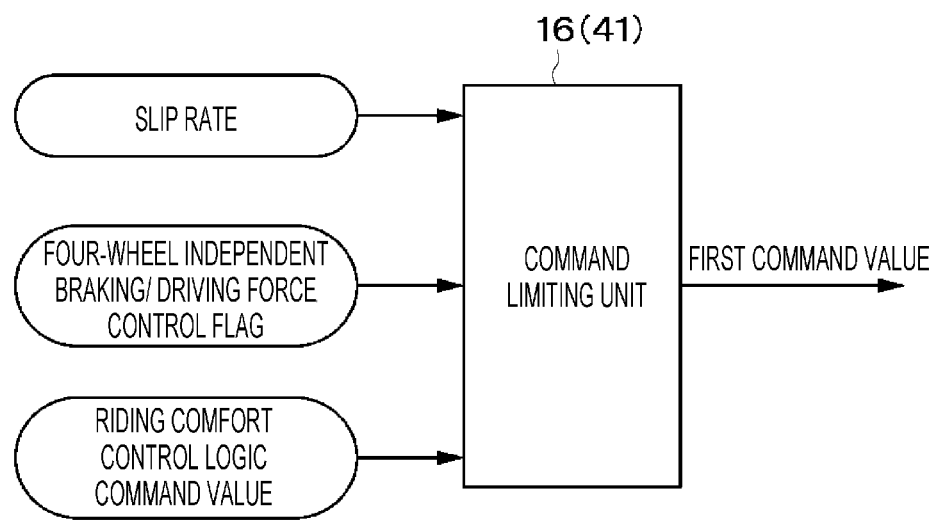
FIG. 3 is a block diagram illustrating a command limiting unit according to the first and fourth embodiments.

The command limiting unit 16 constitutes a control unit of the vehicle control device. The command limiting unit 16 performs a calculation based on the input information and outputs the calculation result. Through the CAN 10, the command limiting unit 16 acquires specifications related to the traveling of the vehicle, such as a slip ratio and a four-wheel independent braking/driving force control flag. As illustrated in FIG. 3, the slip ratio and the four-wheel independent braking/driving force control flag are input to the command limiting unit 16.

The command limiting unit 16 limits the variable range of the damping force generated by the suspension device 5 (damping force generating device) provided between the vehicle body 2 and the wheel 3 of the vehicle based on the acquired specifications regarding the traveling of the vehicle to obtain a first command value that is a damping force control command Specifically, the command limiting unit 16 limits the damping force command value output from the riding comfort control logic 13 based on the specifications related to the traveling of the vehicle. As a result, the command limiting unit 16 obtains the first command value from the damping force command value. Therefore, the damping force command value is the command value before limitation. The first command value is the command value after limitation. The command limiting unit 16 outputs the obtained first command value to the control command selection unit 17.

Figure 4:
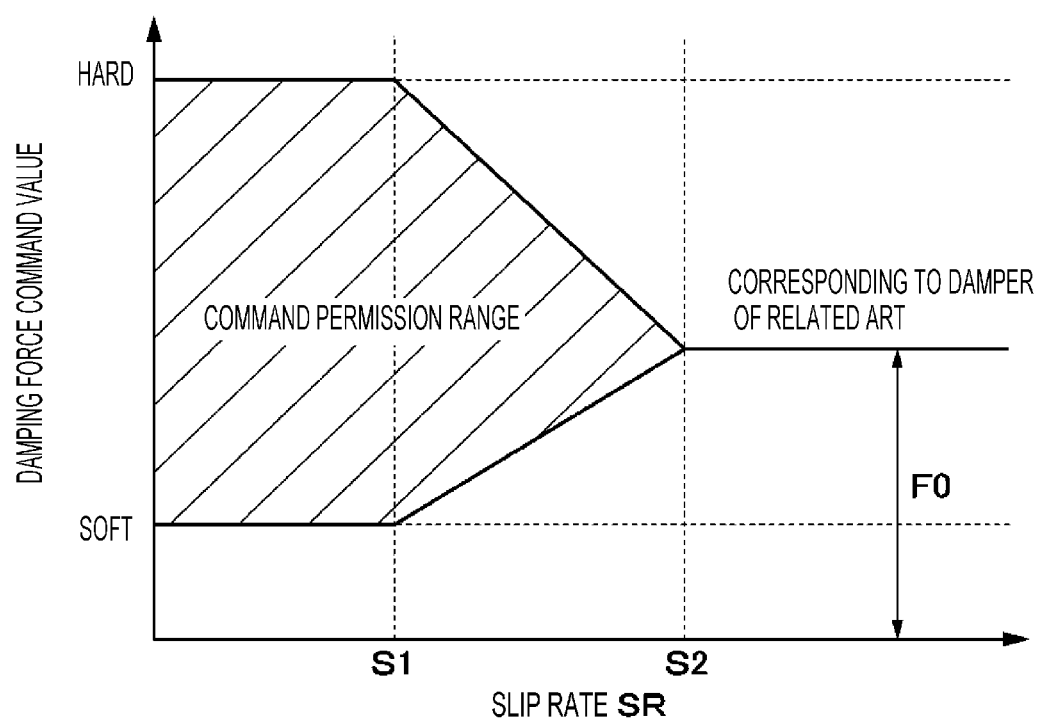
FIG. 4 is a diagram illustrating a relationship between a slip ratio and a command permission range according to the first embodiment.

The command limiting unit 16 limits the variable range of the damping force based on a slip ratio SR of the wheel 3 among the specifications related to the traveling of the vehicle. At this time, the variable range of the damping force corresponds to the command permission range indicated by the shaded area in FIG. 4. As illustrated in FIG. 4, the command limiting unit 16 changes the command permission range based on the slip ratio SR of the wheel 3.

Specifically, when the slip ratio SR is smaller than a preset first threshold value S1 (SR<S1), the command limiting unit 16 does not limit the command permission range. At this time, the first command value becomes the same value as the damping force command value. Therefore, a damping force may be generated in the entire range between hard and soft characteristics.

When the slip ratio SR is equal to or larger than the first threshold value S1 and smaller than a second threshold value S2 larger than the first threshold value S1 (S1≤SR<S2), the command limiting unit 16 limits the command permission range such that the command permission range becomes narrower as the slip ratio SR increases. At this time, the damping force command value is limited such that the first command value is within the command permission range. Therefore, the range in which the damping force may be generated becomes narrower than when the slip ratio SR is smaller than the first threshold value S1 (SR<S1).

When the slip ratio SR is equal to or larger than the second threshold value S2 (S2≤SR), the command limiting unit 16 limits the command permission range to be narrower than the command permission range when the slip ratio SR is smaller than the second threshold value S2. Specifically, when the slip ratio SR is equal to or larger than the second threshold value S2, the command limiting unit 16 sets the command permission range to a preset predetermined value F0. At this time, the first command value becomes a predetermined value F0 regardless of the damping force command value. The predetermined value F0 is set to a value that generates the same damping force as a damper of the related art having, for example, a fixed damping force.

The command limiting unit 16 limits the damping force command value output from the riding comfort control logic 13 to a value within the command permission range. Therefore, when the slip ratio SR is smaller than the first threshold value S1, the command limiting unit 16 outputs the first command value which is the same value as the damping force command value output from the riding comfort control logic 13. When the slip ratio SR is equal to or larger than the first threshold value S1 and smaller than the second threshold value S2, the command limiting unit 16 limits the damping force command value to a value within the command permission range set according to the slip ratio SR, and outputs the first command value in which the value is limited. When the slip ratio SR is equal to or larger than the second threshold value S2, the command limiting unit 16 outputs the first command value set to the predetermined value F0.

At this time, the first threshold value S1 and the second threshold value S2 are set in advance in consideration of, for example, the characteristics of the tire 4. The force that may be generated by the tire 4 (e.g., a braking force, a driving force, etc.) becomes maximum when the slip ratio SR is in the range of 10% to 20%, and decreases when the slip ratio SR is more than the range of 10% to 20%. ABS and TCS perform a control so that the slip ratio SR falls within the range of 10% to 20% when the slip ratio SR increases and deviates from the range of 10% to 20%. The second threshold value S2 is set to a value less than the slip rate at which ABS or TCS operates. As an example, the second threshold value S2 is set to 10% as a slip ratio at which ABS and TCS are considered not to operate. The first threshold value S1 may be a value smaller than the second threshold value S2. Therefore, the first threshold value S1 is set to, for example, about half the value (5%) of the second threshold value S2. The first threshold value S1 may be a value of 5% or more, or may be a value of 5% or less. The first threshold value S1 and the second threshold value S2 are appropriately set by tuning.

Further, the command limiting unit 16 limits the command permission range at the time of controlling not only the slip ratio SR but also the four-wheel independent braking/driving force. For example, when controlling the four-wheel independent braking/driving force in which the ABS, TCS, and ESC are operated, a sudden change in wheel speed occurs, and the estimation accuracy of the vehicle state deteriorates. Therefore, when the four-wheel independent braking/driving force control is operating, the command limiting unit 16 maximizes the limit amount of the command permission range. At this time, the limit amount may be changed instantaneously to the maximum limit amount, or may be gradually set to the maximum limit amount with the passage of time.

As illustrated in FIG. 3, in order to limit the command permission range based on the four-wheel independent braking/driving force control, the four-wheel independent braking/driving force control flag is input to the command limiting unit 16. At this time, the braking/driving force control flag is a control flag for independently braking or driving all wheels of the vehicle. The braking/driving force control flag includes, for example, an ABS operation flag, a TCS operation flag, and an ESC operation flag. For example, a vehicle includes ABS as a safety device for preventing a wheel lock, TCS as a safety device for suppressing a wheel slip, and ESC as a safety device for preventing a vehicle side slip. When the ABS, TCS, and ESC are not all operating, the braking/driving force control flag is set to "OFF." When any of ABS, TCS, and ESC is operating, the braking/driving force control flag is set to "ON." The command limiting unit 16 maximizes the limit amount of the command permission range when the braking/driving force control flag in the "ON" state acquires "ON."

Therefore, when the braking/driving force control flag "ON" for independently braking and driving all wheels of the vehicle including the wheels is acquired among the specifications related to the traveling of the vehicle, the command limiting unit 16 limits the command permission range to be narrower than the command permission range when it is smaller than the second threshold value S2 (see, e.g., FIG. 5). Therefore, when the braking/driving force control flag "ON" is acquired, the command limiting unit 16 outputs the first command value set to the predetermined value F0.

As illustrated in FIG. 2, a first command value output from the command limiting unit 16 and a second command value output from the steering stability control logic 15 are input to the control command selection unit 17. The control command selection unit 17 selects one of the command values. For example, when the vehicle is traveling stably, the control command selection unit 17 selects the first command value output from the command limiting unit 16 in order to prioritize riding comfort. Meanwhile, when the traveling of the vehicle is unstable, the control command selection unit 17 selects a second command value output from the steering stability control logic 15 in order to prioritize steering stability. The control command selection unit 17 may select the command value by comparing, for example, the magnitudes of the two input command values, or may select the command value based on the information regarding the vehicle state. The control command selection unit 17 outputs the command value selected as the current command value to the damping force variable actuator 8 of the variable damper 7.

The vehicle control system 1 according to the embodiment has the above-described configuration. Next, descriptions will be made on a process of variably controlling the damping force characteristic of the variable damper 7 by using the controller 11.

In the variable damper 7 provided between the vehicle body 2 and the wheel 3, a command value (control command) from the controller 11 is input to the damping force variable actuator 8 as a command current. Thus, the damping force variable actuator 8 is driven to variably control the flow path area of the oil liquid flowing in the variable damper 7. As a result, the damping force characteristic of the variable damper 7 is variably controlled between the hard characteristic and the soft characteristic according to the command value.

Even when the estimation accuracy of the vehicle state is lowered in a state where the braking/driving control is not operated, the vehicle control device described in Patent Document 1 determines the damping force of the damping force variable shock absorber based on the wheel speed. For this reason, the control accuracy is lowered, and the riding comfort and steering stability of the vehicle may not be sufficiently ensured.

The controller 11 according to the present embodiment includes the command limiting unit 16. The command limiting unit 16 limits the command permission range of the damping force generated by the variable damper 7 of the suspension device 5 provided between the vehicle body 2 and the wheel 3 of the vehicle based on the specifications related to the traveling of the vehicle, such as a slip rate, to obtain a first command value and outputs the obtained first command value.

Figure 6:
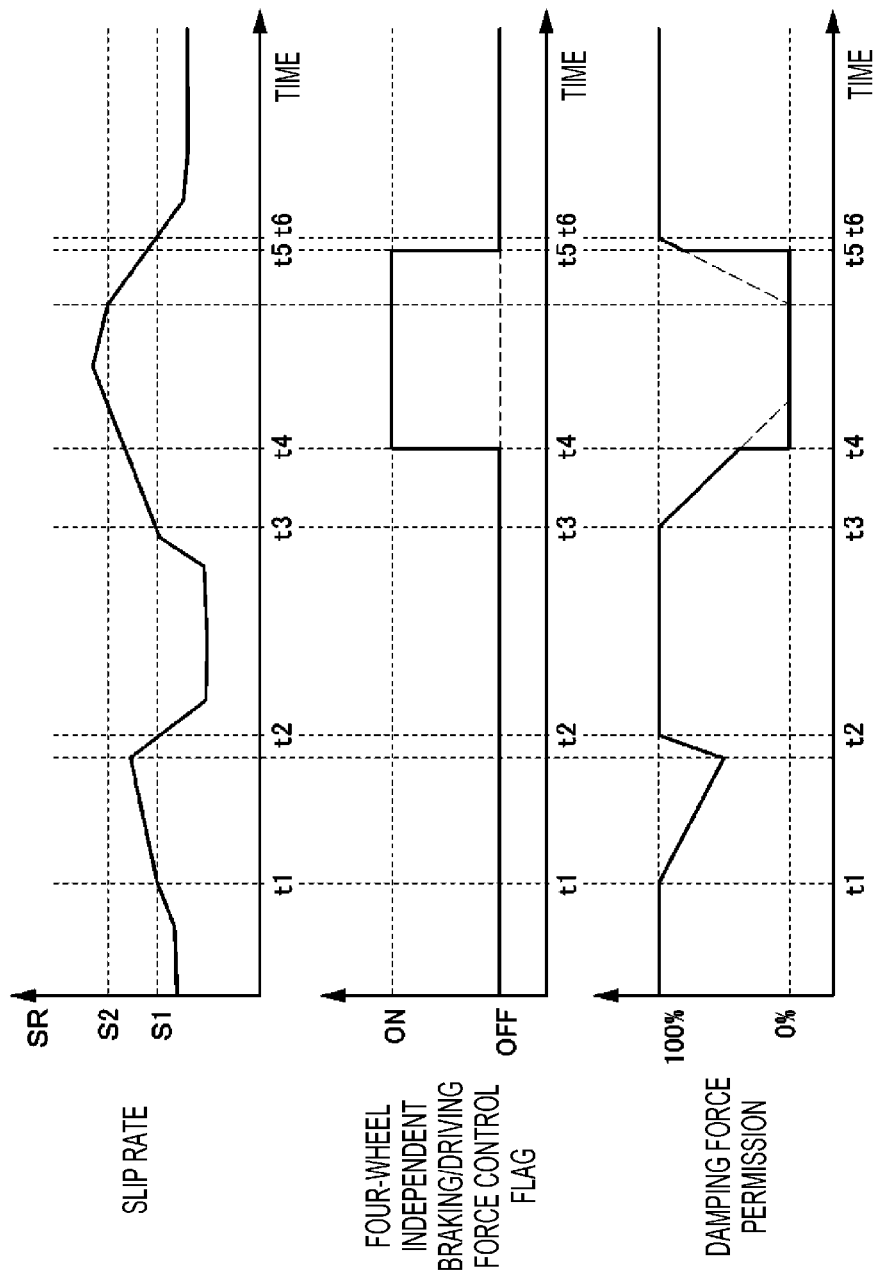
FIG. 6 is a characteristic diagram illustrating examples of time changes in the slip rate, the braking/driving force control flag, and the damping force permission rate.

Therefore, when a slip occurs, the command limiting unit 16 may adjust the damping force of the variable damper 7 according to the slip ratio SR. FIG. 6 illustrates examples of the time changes of the slip rate, the four-wheel independent braking/driving force control flag, and the damping force permission rate when the command limiting unit 16 according to the present embodiment is used. As illustrated in FIG. 6, the slip ratio SR increases from the first threshold value S1 between the time point t1 and the time point t2. At this time, the command limiting unit 16 reduces the damping force permission rate from 100% as the slip ratio SR increases, and reduces the command permission range. From the time point t2 to the time point t3, the slip ratio SR is lowered than the first threshold value S1. Therefore, the command limiting unit 16 returns the damping force permission rate to 100% and releases the limit of the command permission range. From the time point t3 to the time point t4, the slip ratio SR increases from the first threshold value S1. Therefore, the command limiting unit 16 reduces the damping force permission rate from 100% according to the slip rate SR. From the time point t4 to the time point t5, the four-wheel independent braking/driving force control flag is set to "ON." Therefore, the command limiting unit 16 minimizes the damping force permission rate (e.g., 0%) and minimizes the command permission range. From the time point t5 to the time point t6, the slip ratio SR is a value between the first threshold value S1 and the second threshold value S2. Therefore, the command limiting unit 16 reduces the damping force permission rate from 100% according to the slip rate SR. After the time point t6, the slip ratio SR is lowered than the first threshold value S1. Therefore, the command limiting unit 16 returns the damping force permission rate to 100% and releases the limit of the command permission range.

In this way, the command limiting unit 16 may bring the damping force of the variable damper 7 closer to the same damping force as, for example, that of the damper in the related art, according to the slip ratio SR at the time of slip occurrence. As a result, even when a slip occurs, the riding comfort and steering stability may be guaranteed at the same level as the damper in the related art, and the riding comfort and steering stability of the vehicle may be ensured satisfactorily.

Further, in the present embodiment, it is not necessary to detect a decrease in the accuracy of vehicle state estimation, for example, as in the case of ABS, TCS, and ESC operation or braking operation. That is, the controller 11 only needs to detect, for example, the slip ratio SR, and may adjust the damping force of the variable damper 7 according to the slip ratio SR. As a result, the damping force of the variable damper 7 may be changed faster than the vehicle control device described in Patent Document 1.

Thus, the command limiting unit 16 according to the present embodiment acquires the specifications related to the traveling of the vehicle, limits the command permission range (variable range) of the damping force generated by the suspension device 5 (damping force generating device) provided between the vehicle body 2 and the wheel 3 based on the acquired specifications regarding the traveling of the vehicle to obtain the first command value (damping force control command), and outputs the obtained first command value. As a result, it is possible to suppress the delay in the intervention of the damping force control suitable for the road surface condition on which the vehicle travels, thereby improving the riding comfort and the steering stability.

Further, the command limiting unit 16 limits the command permission range of the damping force based on the slip ratio SR of the wheel 3 among the specifications related to the traveling of the vehicle. At this time, when the slip ratio SR is smaller than the preset first threshold value S1, the command limiting unit 16 does not limit the command permission range of the damping force. When the slip ratio SR is larger than the first threshold value S1 and smaller than the second threshold value S2 larger than the first threshold value S1, the command limiting unit 16 limits the command permission range of the damping force such that the command permission range of the damping force becomes narrower as the slip ratio SR increases. When the slip ratio SR is larger than the second threshold value S2, the command limiting unit 16 limits the command permission range of the damping force to be narrower than the command permission range of the damping force when it is smaller than the second threshold value S2.

As a result, the command limiting unit 16 may limit the command permission range of the damping force according to the slip ratio SR even in a state where the slip ratio SR is smaller than the second threshold value S2. Therefore, for example, when the second threshold value S2 is set to a value smaller than the slip ratio SR at which ABS, TCS, and ESC operate, even in a state where a decrease in the estimation accuracy of the stroke speed is not detected, the command limiting unit 16 limits the command permission range of the damping force according to the slip ratio SR. As a result, the command limiting unit 16 may bring the damping force close to a desired value.

In addition, when the slip ratio SR is equal to or larger than the first threshold value S1 and smaller than the second threshold value S2, the command limiting unit 16 limits the command permission range of the damping force so that the command permission range of the damping force becomes narrower as the slip ratio SR increases. At this time, the command limiting unit 16 gradually reduces the command permission range of the damping force as the slip ratio SR increases. Therefore, when the slip ratio SR increases, the command permission range of the damping force does not change sharply.

Further, when the slip ratio SR is larger than the second threshold value S2, the command limiting unit 16 sets the command permission range of the damping force to a preset predetermined value F0. For example, when the predetermined value F0 is set to a value equivalent to the damping force of the damper in the related art, the command limiting unit 16 may bring the damping force of the variable damper 7 closer to the damping force of the damper in the related art according to the increase of the slip ratio SR. As a result, even when a slip occurs, the riding comfort and steering stability may be guaranteed at the same level as the damper in the related art, and the riding comfort and steering stability of the vehicle may be ensured satisfactorily.

In addition, when a control flag (braking/driving force control flag) for independently braking and driving all wheels of the vehicle including the wheel 3 is acquired among the specifications related to the traveling of the vehicle, the command limiting unit 16 limits the command permission range of the damping force to be narrower than the command permission range of the damping force when it is smaller than the second threshold value S2. Thus, for example, in the traveling state of the vehicle in which ABS, TCS, and ESC operate, the command limiting unit 16 may narrow the command permission range of the damping force and bring the damping force closer to a desired value.

Next, FIGS. 2 and 7 to 10 illustrate a second embodiment. The feature of the second embodiment is that the command limiting unit limits the variable range of the damping force by using the front/rear acceleration and the road friction coefficient, or by using the four-wheel independent braking/driving force control flag. In the second embodiment, the same components as those in the first embodiment described above are designated by the same reference numerals, and the description thereof will be omitted.

As illustrated in FIG. 2, in the second embodiment, the controller 11 includes a command limiting unit 21 instead of the command limiting unit 16 according to the first embodiment. The command limiting unit 21 constitutes a control unit of the vehicle control device.

Figure 7:
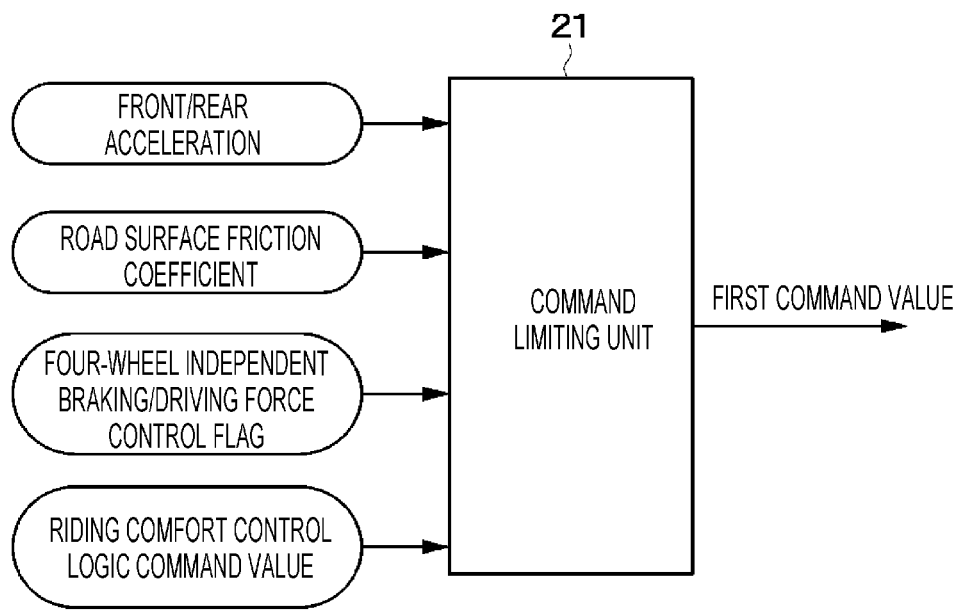
FIG. 7 is a block diagram illustrating a command limiting unit according to a second embodiment.

The command limiting unit 21 is configured in the same manner as the command limiting unit 16 according to the first embodiment. As illustrated in FIG. 7, the command limiting unit 21 acquires specifications related to the traveling of the vehicle such as the front/rear acceleration G of the vehicle, the road surface friction coefficient μ, and the four-wheel independent braking/driving force control flag through the CAN 10. The command limiting unit 21 limits a variable range (command permission range) of the damping force generated by the suspension device 5 provided between the vehicle body 2 and the wheel 3 of the vehicle based on the acquired specifications regarding the traveling of the vehicle to obtain a first command value which is a damping force control command. The command limiting unit 21 outputs the obtained first command value.

Figure 8:
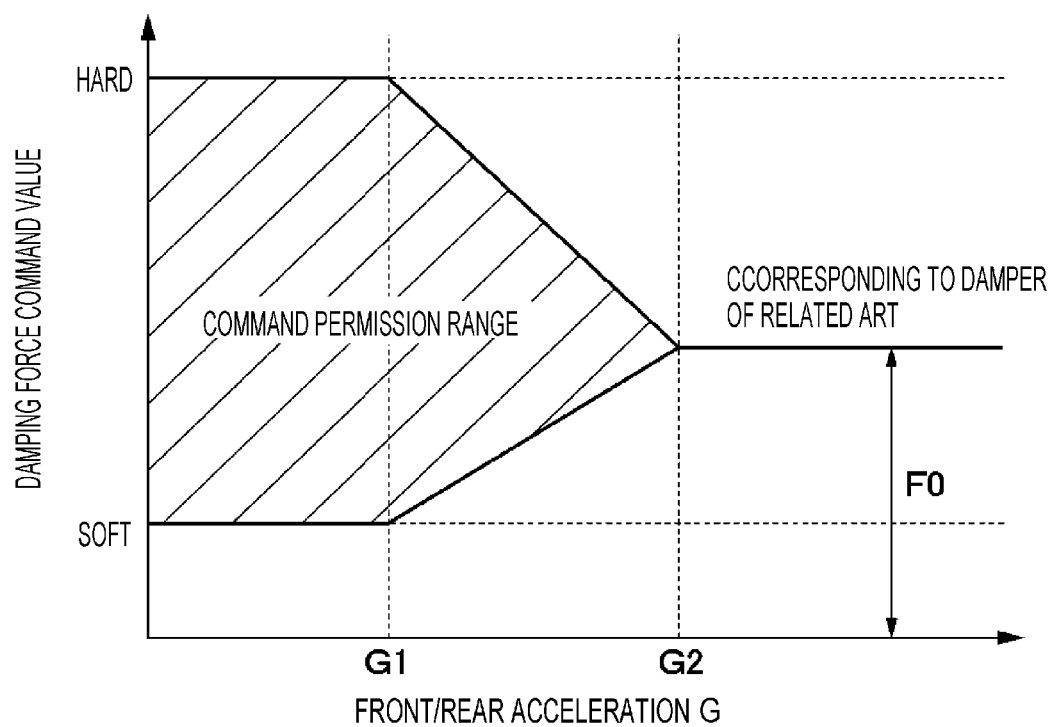
FIG. 8 is a diagram illustrating a relationship between a front/rear acceleration and a command permission range according to the second embodiment.
Figures 9, 10:
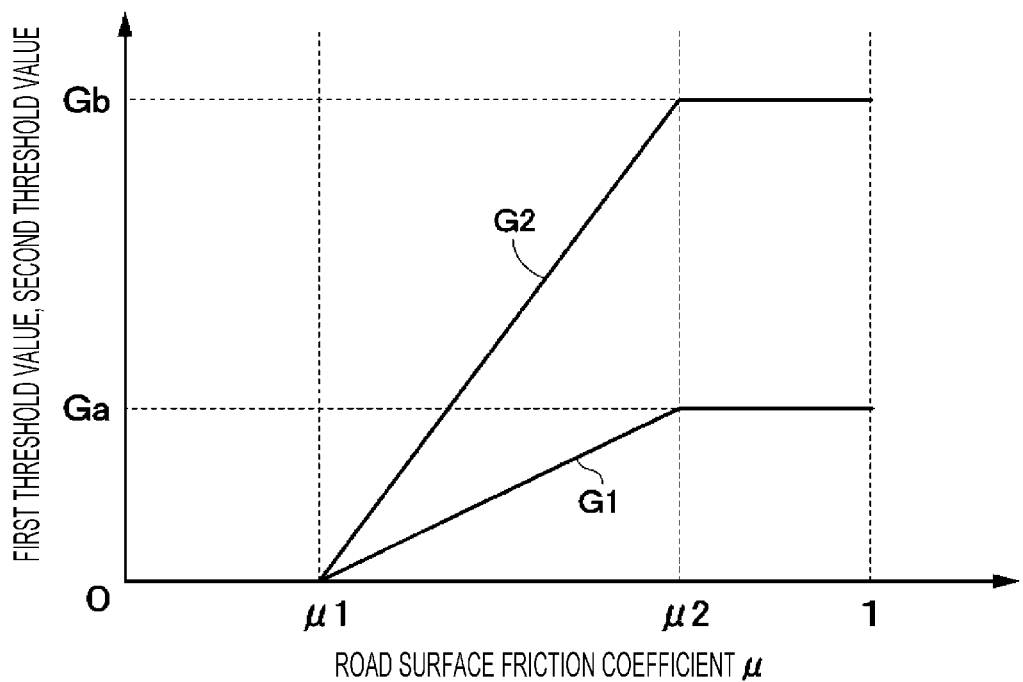
FIG. 9 is a diagram illustrating a relationship between a road surface friction coefficient and a first threshold value/a second threshold value of the front/rear acceleration according to the second embodiment.
FIG. 10 is a diagram illustrating a relationship of the limit of the command permission range with the front/rear acceleration and a braking/driving force control flag according to the second embodiment.

As illustrated in FIGS. 8 and 9, the command limiting unit 21 limits the command permission range of the damping force based on the front/rear acceleration G of the wheel 3 and the road surface friction coefficient μ among the specifications related to the traveling of the vehicle. As indicated by the shaded area in FIG. 8, when the front/rear acceleration G is smaller than the first threshold value G1 (G<G1), the command limiting unit 21 does not limit the command permission range. When the front/rear acceleration G is equal to or larger than the first threshold value G1 and smaller than the second threshold value G2 larger than the first threshold value G1 (G1≤G<G2), the command limiting unit 21 limits the command permission range such that the command permission range becomes narrower as the front/rear acceleration G increases. When the front/rear acceleration G is equal to or larger than the second threshold value G2 (G2≤G), the command limiting unit 21 limits the command permission range to be narrower than the command permission range when it is smaller than the second threshold value G2. Specifically, when the front/rear acceleration G is equal to or larger than the second threshold value G2, the command limiting unit 21 sets the command permission range to a preset predetermined value F0.

At this time, the command limiting unit 21 changes the first threshold value G1 and the second threshold value G2 according to the road surface friction coefficient µ (see, e.g., FIG. 9). In general, a vehicle may not generate acceleration and deceleration of a road friction coefficient µ or more. For example, when the road surface friction coefficient µ is smaller than a first reference value µ1 (e.g., µ1=0.1) (µ<µ1), since the road surface friction coefficient µ is relatively too small, it is difficult to control the vehicle state by the suspension device 5. Therefore, the command limiting unit 21 sets both the first threshold value G1 and the second threshold value G2 to the minimum values (e.g., G1, G2=0 m/s$^2$). In this case, the command limiting unit 21 minimizes the command permission range. The minimum value of the first threshold value G1 and the minimum value of the second threshold value G2 may be different from each other.

When the road surface friction coefficient µ is equal to or larger than a first reference value µ1 and smaller than a second reference value µ2 (e.g., µ2=0.8) (µ1≤µ<µ2), the command limiting unit 21 increases the first threshold value G1 and the second threshold value G2 as the road surface friction coefficient µ increases. At this time, the rate of increase of the second threshold value G2 is larger than the rate of increase of the first threshold value G1. Therefore, the second threshold value G2 has a larger value than the first threshold value G1.

When the road surface friction coefficient µ is equal to or larger than the second reference value µ2 (µ≥µ2), since the road surface friction coefficient µ is sufficiently large, even when the road surface friction coefficient µ changes, the change in the vehicle state becomes smaller. Therefore, the command limiting unit 21 sets the first threshold value G1 and the second threshold value G2 to the maximum values Ga and Gb corresponding to the second reference value µ2. At this time, the maximum value Ga is the maximum value of the first threshold value G1 (e.g., Ga=0.1 m/s$^2$). The maximum value Gb is the maximum value of the second threshold value G2 (e.g., Gb=0.4 m/s$^2$). The maximum value Gb is larger than the maximum value Ga. Without being limited to those illustrated in FIG. 9, the first threshold value G1 and the second threshold value G2 are appropriately set by tuning.

The command limiting unit 21 limits the damping force command value output from the riding comfort control logic 13 to a value within the command permission range. Therefore, when the front/rear acceleration G is smaller than the first threshold value G1, the command limiting unit 21 outputs the first command value which is the same value as the damping force command value output from the riding comfort control logic 13. When the front/rear acceleration G is equal to or larger than the first threshold value G1 and smaller than the second threshold value G2, the command limiting unit 21 limits the damping force command value to a value within the command permission range set according to the front/rear acceleration G, and outputs the first command value in which the value is limited. When the front/rear acceleration G is equal to or larger than the second threshold value G2, the command limiting unit 21 outputs the first command value set to the predetermined value F0.

Further, the command limiting unit 21 limits the command permission range at the time of controlling not only the front/rear acceleration G but also the four-wheel independent braking/driving force (see, e.g., FIG. 10). Therefore, when the four-wheel independent braking/driving force control is operating, the command limiting unit 21 maximizes the limit amount of the command permission range. At this time, the command limiting unit 21 outputs the first command value set to the predetermined value F0, as in the case where the front/rear acceleration G is equal to or larger than the second threshold value G2.

Thus, even in the second embodiment, substantially the same effect as that in the first embodiment may be obtained. Further, in the second embodiment, the command limiting unit 21 limits the command permission range of the damping force based on the front/rear acceleration G of the vehicle among the specifications related to the traveling of the vehicle. Therefore, the command limiting unit 21 narrows the command permission range of the damping force as the front/rear acceleration G increases, so that the damping force of the variable damper 7 may be brought close to the damping force of, for example, the damper in the related art.

Further, the command limiting unit 21 changes the first threshold value G1 and the second threshold value G2 for changing the limitation of the variable range of the damping force based on the road surface friction coefficient µ on the road surface on which the vehicle travels. As a result, the command limiting unit 21 may adjust the command permission range of the damping force in consideration of the road surface friction coefficient µ.

Next, FIGS. 2 and 11 to 15 illustrate a third embodiment. The feature of the third embodiment is that the command limiting unit limits the variable range of the damping force by using the engine torque, the brake fluid pressure, and the road friction coefficient, or by using the four-wheel independent braking/driving force control flag. In the third embodiment, the same components as those in the first embodiment described above are designated by the same reference numerals, and the description thereof will be omitted.

As illustrated in FIG. 2, in the third embodiment, the controller 11 includes a command limiting unit 31 instead of the command limiting unit 16 according to the first embodiment. The command limiting unit 31 constitutes a control unit of the vehicle control device.

Figure 11:
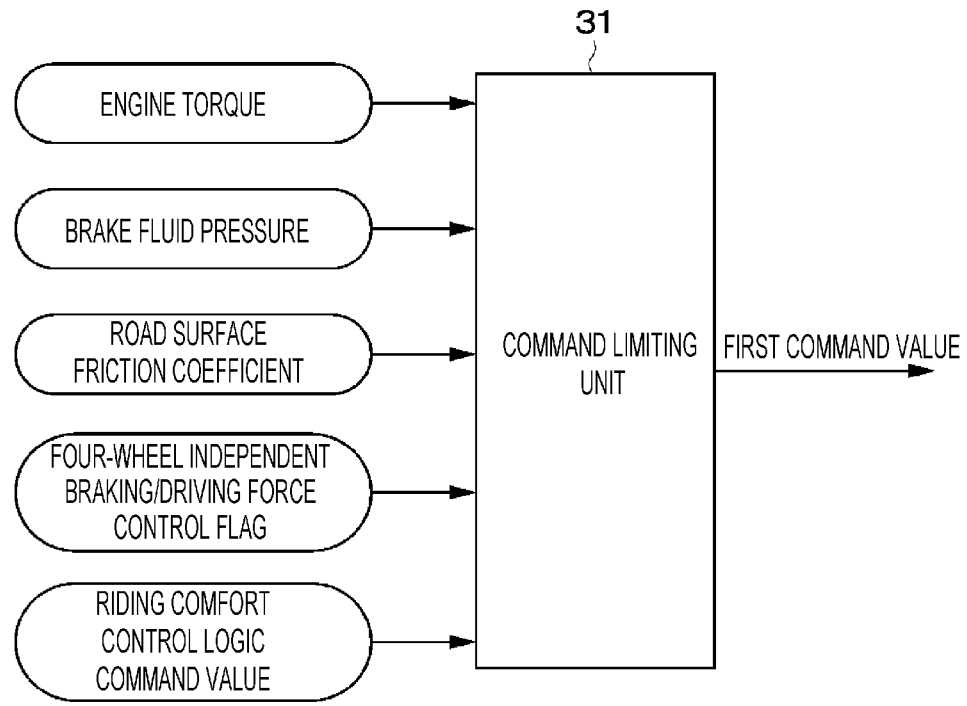
FIG. 11 is a block diagram illustrating a command limiting unit according to a third embodiment.

The command limiting unit 31 is configured in the same manner as the command limiting unit 16 according to the first embodiment. As illustrated in FIG. 11, the command limiting unit 31 acquires specifications related to the traveling of the vehicle, such as the engine torque T, brake fluid pressure P, road surface friction coefficient µ, and four-wheel independent braking/driving force control flag, through the CAN 10. At this time, the engine torque T and the brake fluid pressure P correspond to the brake/drive torque (drive torque and brake torque) applied to the wheels.

The command limiting unit 31 limits the variable range (command permission range) of the damping force generated by the suspension device 5 provided between the vehicle body 2 and the wheel 3 of the vehicle based on the acquired specifications regarding the traveling of the vehicle to obtain a first command value which is a damping force control command. At this time, the command limiting unit 31 limits the damping force command value output from the riding comfort control logic 13 to a value within the command permission range. The command limiting unit 31 outputs the obtained first command value.

Figure 12:
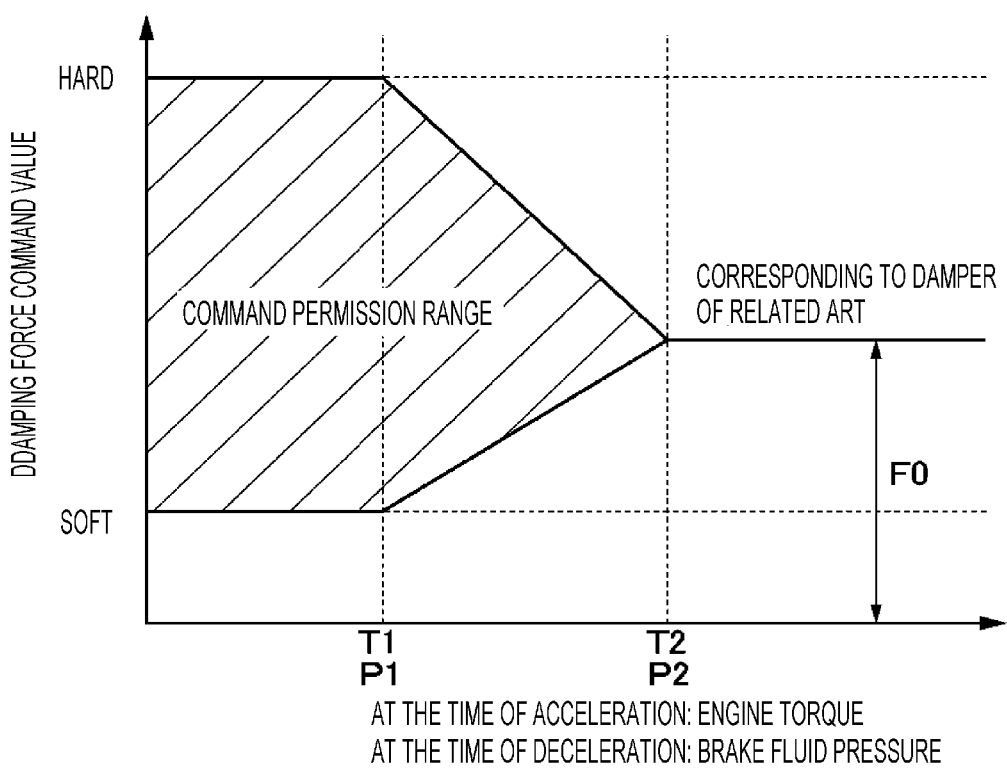
FIG. 12 is a diagram illustrating a relationship among an engine torque, a brake fluid pressure, and a command permission range according to the third embodiment.
Figure 13:
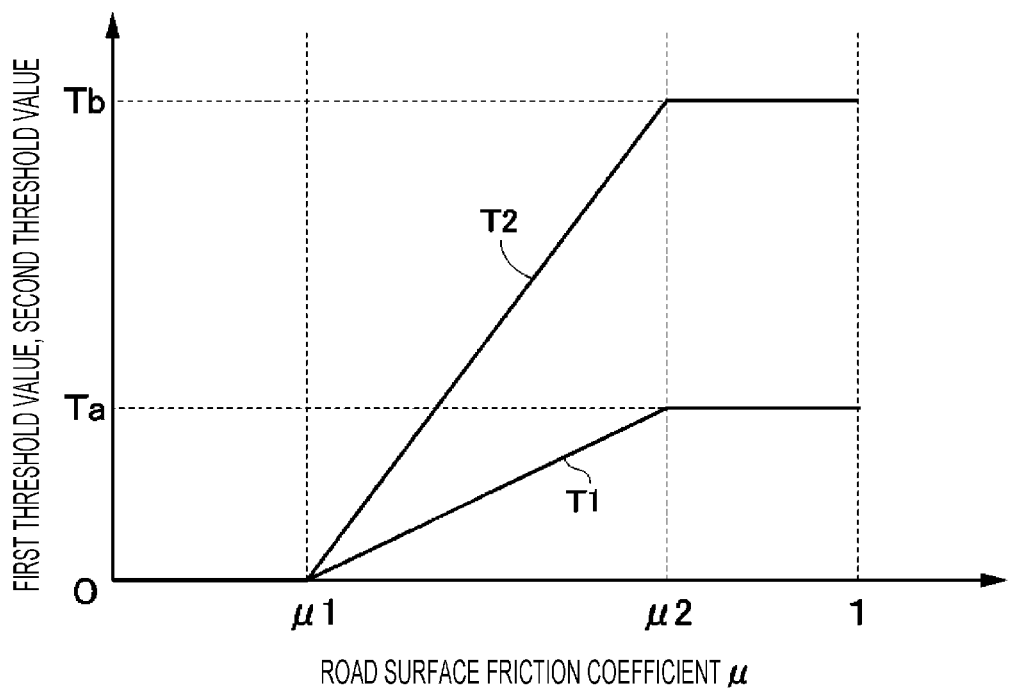
FIG. 13 is a diagram illustrating a relationship between a road surface friction coefficient and a first threshold value/a second threshold value of the engine torque according to the third embodiment.

As illustrated in FIGS. 12 and 13, when the vehicle is accelerating, the command limiting unit 31 limits the command permission range of the damping force based on the engine torque T and the road surface friction coefficient μ among the specifications related to the traveling of the vehicle. As indicated by the shaded area in FIG. 12, the command limiting unit 31 does not limit the command permission range when the engine torque T is smaller than the first threshold value T1 (T<T1). When the engine torque T is equal to or larger than the first threshold value T1 and smaller than the second threshold value T2 larger than the first threshold value T1 (T1≤T<T2), the command limiting unit 31 limits the command permission range so that the command permission range becomes narrower as the engine torque T increases. When the engine torque T is equal to or larger than the second threshold value T2 (T2≤T), the command limiting unit 31 limits the command permission range to be narrower than the command permission range when it is smaller than the second threshold value T2. Specifically, when the engine torque T is equal to or larger than the second threshold value T2, the command limiting unit 31 sets the command permission range to a preset predetermined value F0.

Figure 14:
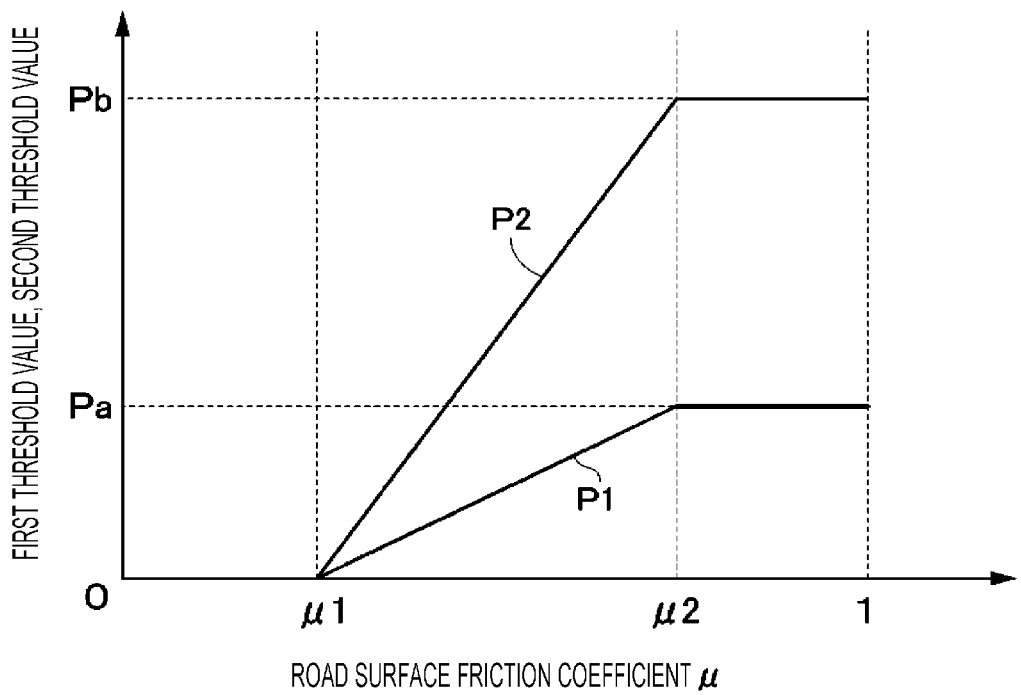
FIG. 14 is a diagram illustrating a relationship between a road surface friction coefficient and a first threshold value/a second threshold value of the brake fluid pressure according to the third embodiment.

As illustrated in FIGS. 12 and 14, when the vehicle is decelerating, the command limiting unit 31 limits the command permission range of the damping force based on the brake fluid pressure P and the road surface friction coefficient μ among the specifications related to the running of the vehicle. As indicated by the shaded area in FIG. 12, the command limiting unit 31 does not limit the command permission range when the brake fluid pressure P is smaller than the first threshold value P1 (P<P1). When the brake fluid pressure P is equal to or larger than the first threshold value P1 and smaller than the second threshold value P2 larger than the first threshold value P1 (P1≤P<P2), the command limiting unit 31 limits the command permission range so that the command permission range becomes narrower as the brake fluid pressure P increases. When the brake fluid pressure P is equal to or larger than the second threshold value P2 (P2≤P), the command limiting unit 31 limits the command permission range to be narrower than the command permission range when it is smaller than the second threshold value P2. Specifically, when the brake fluid pressure P is equal to or larger than the second threshold value P2, the command limiting unit 31 sets the command permission range to a preset predetermined value F0.

At this time, the command limiting unit 31 changes the first threshold values T1 and P1 and the second threshold values T2 and P2 according to the road surface friction coefficient μ (see, e.g., FIGS. 13 and 14). For example, when the road surface friction coefficient μ is smaller than the first reference value μ1 (μ<μ1), the command limiting unit 31 sets both the first threshold value T1 and the second threshold value T2 to the minimum values (e.g., T1, T2=0 N·m). In this case, the command limiting unit 31 minimizes the command permission range. The minimum value of the first threshold value T1 and the minimum value of the second threshold value T2 may be different from each other.

Further, when the road surface friction coefficient μ is smaller than the first reference value μ1 (μ<μ1), the command limiting unit 31 sets both the first threshold value P1 and the second threshold value P2 to the minimum values (e.g., P1, P2=0 MPa). In this case, the command limiting unit 31 minimizes the command permission range. The minimum value of the first threshold value P1 and the minimum value of the second threshold value P2 may be different from each other.

When the road surface friction coefficient μ is equal to or larger than the first reference value μ1 and smaller than the second reference value μ2 (μ1≤μ<μ2), the command limiting unit 31 increases the first threshold value T1 and the second threshold value T2, and increases the first threshold value P1 and the second threshold value P2 as the road surface friction coefficient μ increases. At this time, the rate of increase of the second threshold value T2 is larger than the rate of increase of the first threshold value T1. Therefore, the second threshold value T2 has a larger value than the first threshold value T1. Similarly, the rate of increase of the second threshold P2 is larger than the rate of increase of the first threshold P1. Therefore, the second threshold value P2 has a larger value than the first threshold value P1.

When the road surface friction coefficient μ is equal to or larger than the second reference value μ2 (μ≥μ2), the command limiting unit 31 sets the first threshold value T1 and the second threshold value T2 to the maximum values Ta and Tb corresponding to the second reference value μ2. At this time, the maximum value Ta is the maximum value of the first threshold value T1 (e.g., Ta=50 N·m). The maximum value Tb is the maximum value of the first threshold value T2 (e.g., Tb=100 N·m). The maximum value Tb is larger than the maximum value Ta.

Similarly, when the road surface friction coefficient μ is equal to or larger than the second reference value μ2 (μ≥μ2), the command limiting unit 31 sets the first threshold value P1 and the second threshold value P2 to the maximum values Pa and Pb corresponding to the second reference value μ2. At this time, the maximum value Pa is the maximum value of the first threshold value P1 (e.g., Pa=1 MPa). The maximum value Pb is the maximum value of the first threshold value P2 (e.g., Pb=5 MPa). The maximum value Pb is larger than the maximum value Pa. Without being limited to those illustrated in FIGS. 13 and 14, the first threshold values T1 and P1 and the second threshold values T2 and P2 are appropriately set by tuning.

Further, the command limiting unit 31 limits the command permission range at the time of controlling not only the engine torque T and the brake fluid pressure P but also the four-wheel independent braking/driving force (see, e.g., FIG. 15). Therefore, when the four-wheel independent braking/driving force control is operating, the command limiting unit 31 maximizes the limit amount of the command permission range. At this time, the command limiting unit 31 outputs the first command value set to the predetermined value F0.

Thus, even in the third embodiment, substantially the same effect as that in the first embodiment may be obtained. Further, in the third embodiment, the command limiting unit 31 limits the command permission range of the damping force based on the engine torque T among the specifications related to the traveling of the vehicle. The command limiting unit 31 limits the command permission range of the damping force based on the brake fluid pressure P among the specifications related to the traveling of the vehicle. Here, when the vehicle is accelerating, the engine torque T corresponds to the front/rear acceleration. When the vehicle is decelerating, the brake fluid pressure P corresponds to the front/rear acceleration. Therefore, even in the third embodiment, the same action and effect as in the second embodiment may be obtained.

Further, the command limiting unit 31 changes the first threshold values T1 and P1 and the second threshold values T2 and P2 for changing the limitation of the variable range of the damping force based on the road surface friction coefficient μ on the road surface on which the vehicle travels. As a result, the command limiting unit 31 may adjust the command permission range of the damping force in consideration of the road surface friction coefficient μ.

Next, FIGS. 2, 3, and 16 illustrate a fourth embodiment. The feature of the fourth embodiment is that the command limiting unit limits the variable range of the damping force so that the damping force becomes softer as the slip ratio increases. In the fourth embodiment, the same components as those in the first embodiment described above are designated by the same reference numerals, and the description thereof will be omitted.

As illustrated in FIG. 2, in the fourth embodiment, the controller 11 includes a command limiting unit 41 instead of the command limiting unit 16 according to the first embodiment. The command limiting unit 41 constitutes a control unit of the vehicle control device.

The command limiting unit 41 is configured in the same manner as the command limiting unit 16 according to the first embodiment. As illustrated in FIG. 3, the command limiting unit 41 acquires specifications related to the traveling of the vehicle, such as a slip ratio and a four-wheel independent braking/driving force control flag, through the CAN 10. The command limiting unit 41 limits a variable range (command permission range) of the damping force generated by the suspension device 5 provided between the vehicle body 2 and the wheel 3 of the vehicle based on the acquired specifications related to the traveling of the vehicle to obtain a first command value which is a damping force control command. The command limiting unit 41 outputs the obtained first command value.

As illustrated in FIG. 16, the command limiting unit 41 limits the command permission range of the damping force based on the slip ratio SR of the wheel 3 among the specifications related to the traveling of the vehicle. As indicated by the shaded area in FIG. 16, the command limiting unit 41 does not limit the command permission range when the slip ratio SR is smaller than the preset first threshold value S1 (SR<S1). When the slip ratio SR is equal to or larger than the first threshold value S1 and smaller than the second threshold value S2 larger than the first threshold value S1 (S1≤SR<S2), the command limiting unit 41 limits the command permission range such that the command permission range becomes narrower as the slip ratio SR increases. When the slip ratio SR is equal to or larger than the second threshold value S2 (S2≤SR), the command limiting unit 41 limits the command permission range to be narrower than the command permission range when the slip ratio SR is smaller than the second threshold value S2.

At this time, when the slip ratio SR is equal to or larger than the second threshold value S2, the command limiting unit 41 sets the command permission range to a preset predetermined value F1. The predetermined value F1 is set to, for example, a value at which the damping force becomes softer. Therefore, the predetermined value F1 is different from the predetermined value F0 according to the first embodiment.

The command limiting unit 41 limits the damping force command value output from the riding comfort control logic 13 to a value within the command permission range. Further, the command limiting unit 41 limits the command permission range at the time of controlling not only the slip ratio SR but also the four-wheel independent braking/driving force. Therefore, when the four-wheel independent braking/driving force control is operating, the command limiting unit 41 maximizes the limit amount of the command permission range. At this time, the command limiting unit 41 outputs the first command value set to the predetermined value F1, as in the case where the front/rear acceleration G is equal to or larger than the second threshold value G2.

Thus, even in the fourth embodiment, substantially the same effect as that of the first embodiment may be obtained. In the fourth embodiment, the command limiting unit 41 limits the variable range (command permission range) of the damping force so that the damping force becomes softer as the slip ratio SR increases. Therefore, even in a state where the variable range of the damping force is limited, the riding comfort may be improved.

In order to confirm this effect, a vehicle simulation was performed for the fourth embodiment and a comparative example. In the comparative example, the control conditions disclosed in Patent Document 1 were used. The vehicle model used for the simulation was a hatchback type passenger car. The road surface was set as a road surface prone to vibration on the spring of 2 to 8 Hz, which affects the riding comfort. The road surface friction coefficient μ was set to 0.4. The initial vehicle speed when entering the road surface was set to 80 km/h. The brake pressure was 2.5 MPa.

Figure 17:
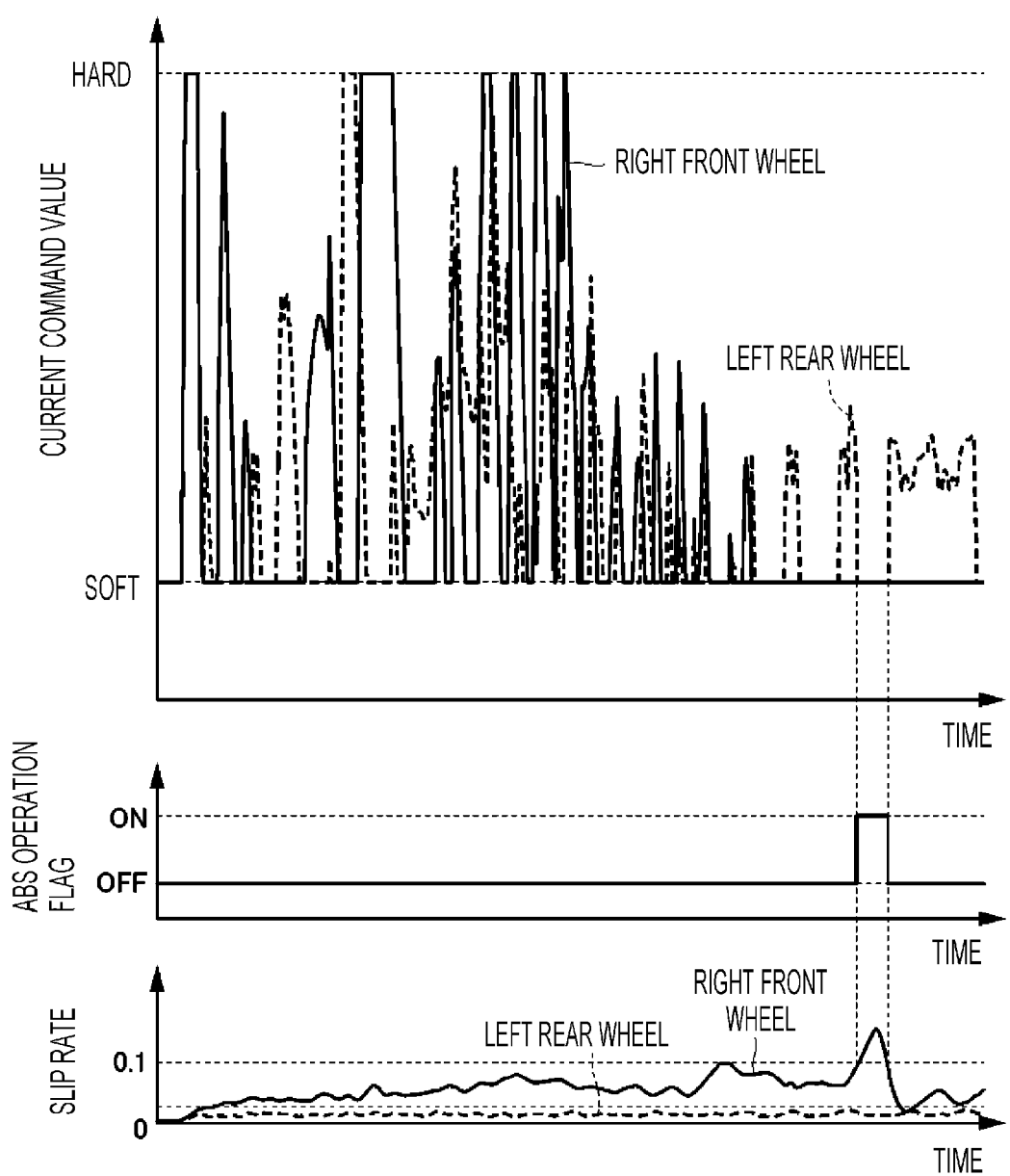
FIG. 17 is a characteristic diagram illustrating examples of time changes in a current command value, an ABS operation flag, and a slip rate according to a comparative example.

First, the results of the comparative example are illustrated in FIG. 17. FIG. 17 illustrates the time changes of the slip ratio SR, the ABS operation flag (braking/driving force control flag), and the current command value output from the controller 11. In the comparative example, the current command value may not be limited unless the estimated accuracy is lowered when the ABS is operated. Therefore, it may be seen that the current command value is limited so that the damping force becomes softer only when the ABS is operated.

Figure 18:
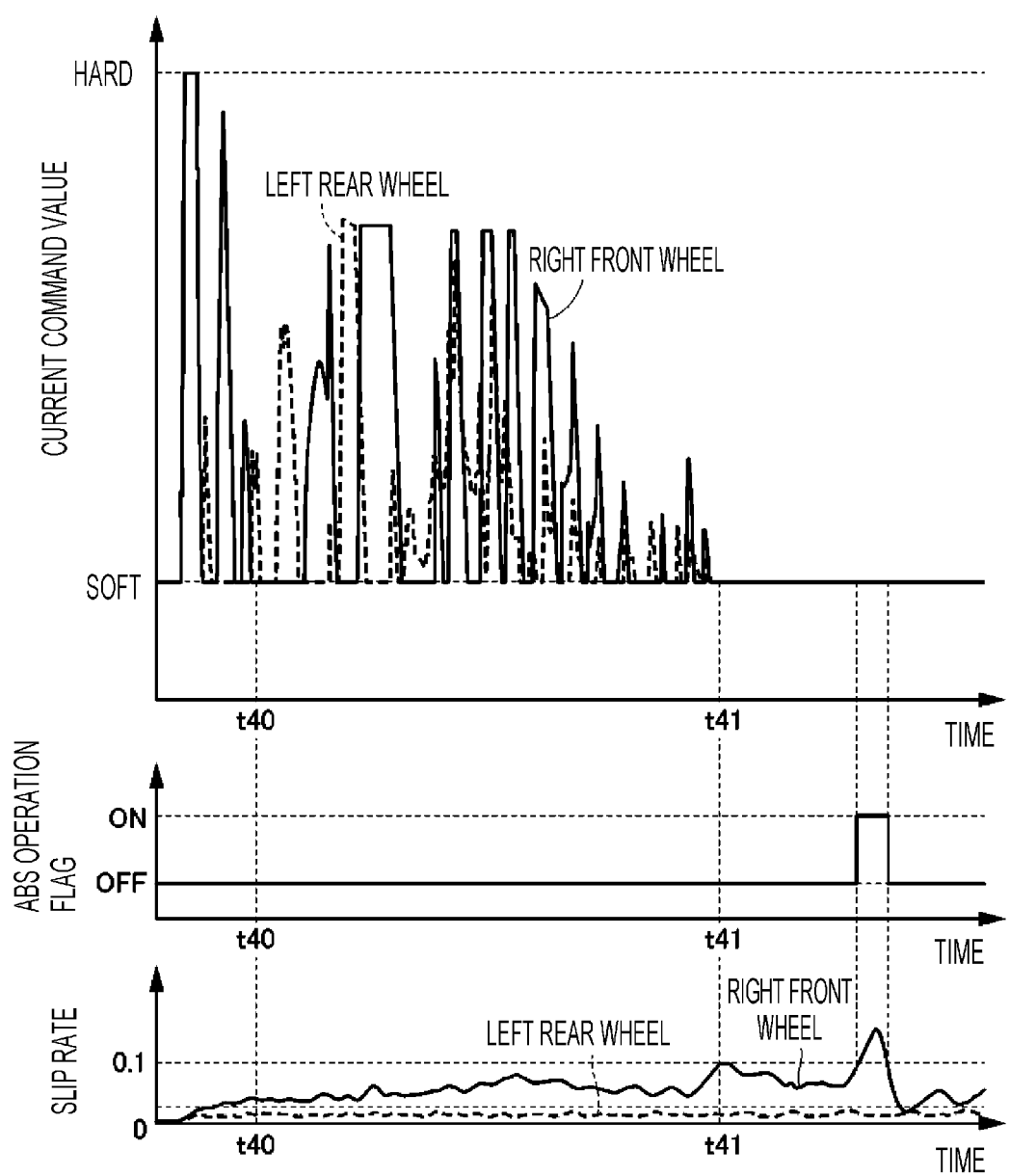
FIG. 18 is a characteristic diagram illustrating examples of time changes in a current command value, an ABS operation flag, and a slip ratio according to the fourth embodiment.

The results of the fourth embodiment are illustrated in FIG. 18. The command limiting unit 41 according to the fourth embodiment limits the damping force by using only the slip ratio SR as a trigger. Therefore, it may be seen that the current command value is limited from around the time point t40. It may be seen that the damping force is completely softly limited near the time point t41. From this, it is considered that the command limiting unit 41 according to the fourth embodiment may limit the damping force even before the ABS operates, and the deterioration of riding comfort may be suppressed.

Figure 19:
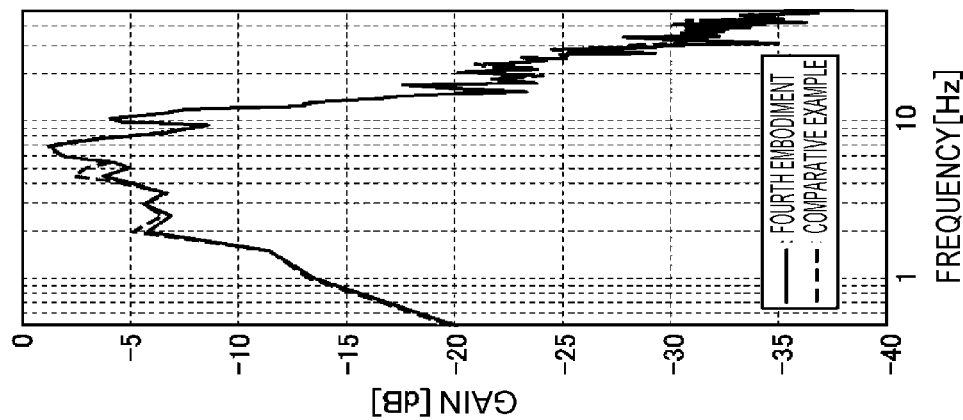
FIG. 19 is a characteristic diagram illustrating frequency characteristics of the power spectral density of a spring vibration at a rear wheel side position according to the comparative example and the fourth embodiment.
Figure 20:
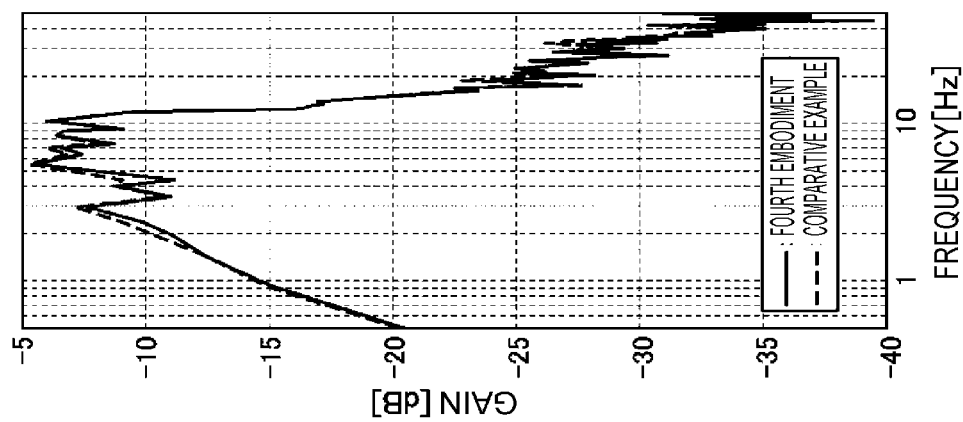
FIG. 20 is a characteristic diagram illustrating frequency characteristics of the power spectral density of a spring vibration at a front wheel side position according to the comparative example and the fourth embodiment.
Figure 21:
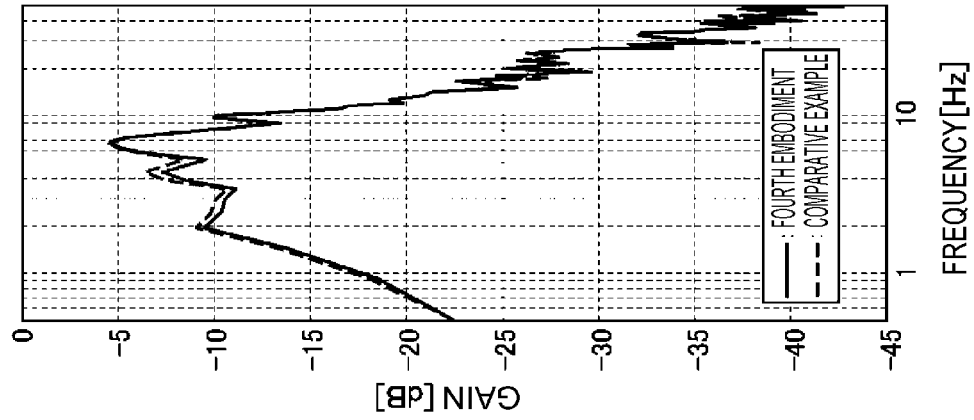
FIG. 21 is a characteristic diagram illustrating frequency characteristics of the power spectral density of a spring vibration at a driver's seat position according to the comparative example and the fourth embodiment.

Next, with respect to the fourth embodiment and the comparative example, the power spectral density (PSD) of the spring acceleration is illustrated in FIGS. 19 to 21. FIG. 19 illustrates the PSD at the rear wheel side position. FIG. 20 illustrates the PSD at the front wheel side position. FIG. 21 illustrates the PSD of the driver's seat position. As illustrated in FIGS. 19 to 21, it may be seen that the gain in the vicinity of 2 to 7 Hz is reduced in the fourth embodiment as compared with the comparative example, and the riding comfort is improved.

Figure 22:
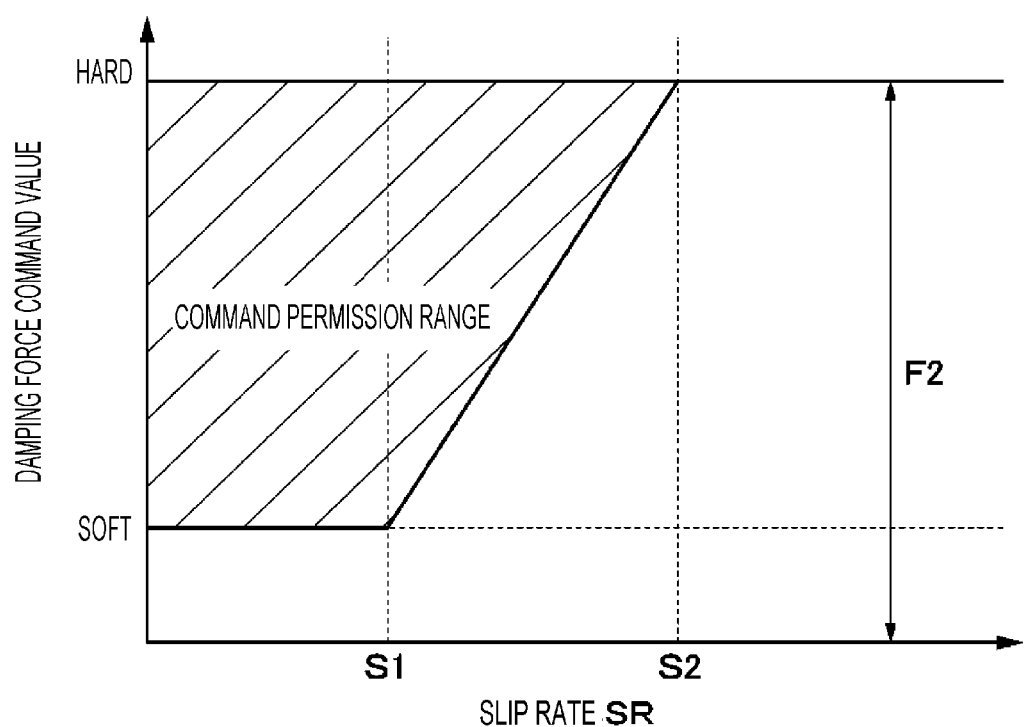
FIG. 22 is a diagram illustrating a relationship between a slip ratio and a command permission range according to a first modification.

In the fourth embodiment, when the slip ratio SR is equal to or larger than the second threshold value S2, the command permission range is limited to a predetermined value F1 such that the damping force becomes softer. Without being limited thereto, for example, when the slip ratio SR is equal to or larger than the second threshold value S2 in a first modification illustrated in FIG. 22, the command permission range may be limited to a predetermined value F2 such that the damping force becomes harder. In this case, steering stability may be improved when the slip ratio SR increases. A predetermined value that limits the command permission range is appropriately set by tuning. This configuration may also be applied to the second and third embodiments.

Figure 23:
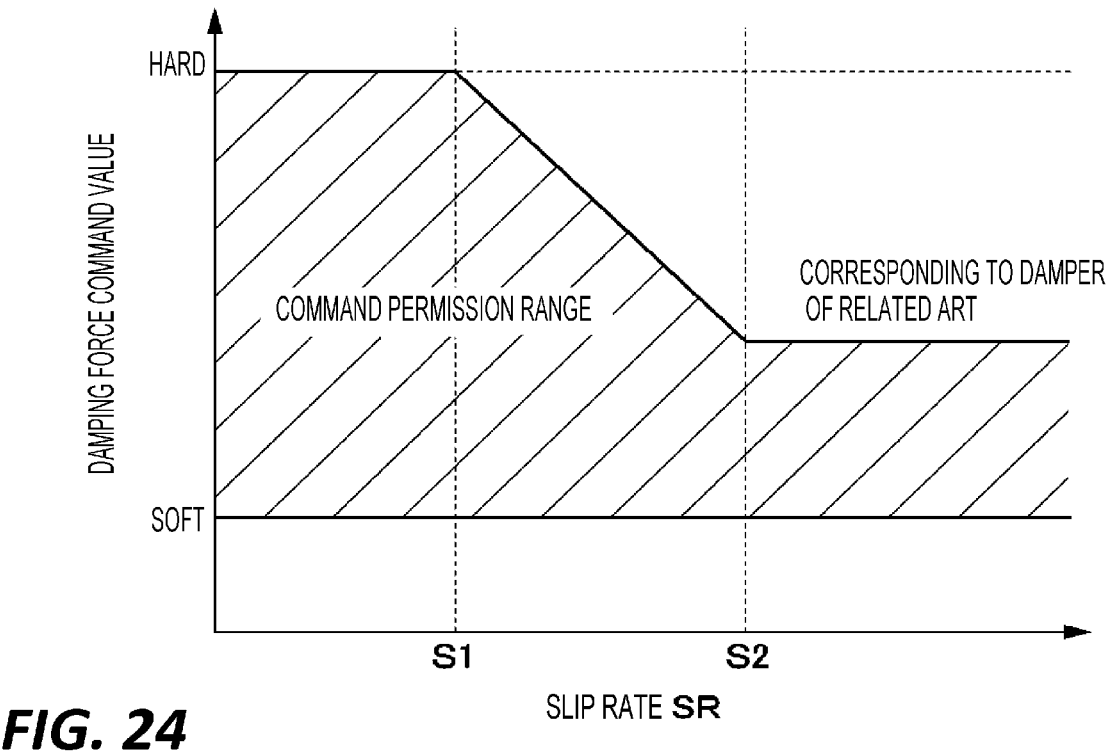
FIG. 23 is a diagram illustrating a relationship between a slip ratio and a command permission range according to a second modification.

In the fourth embodiment, when the slip ratio SR is equal to or larger than the second threshold value S2, the command permission range is limited to a predetermined value F1 which is a constant value. The present disclosure is not limited thereto. For example, as illustrated in FIGS. 23 and

Figure 24:
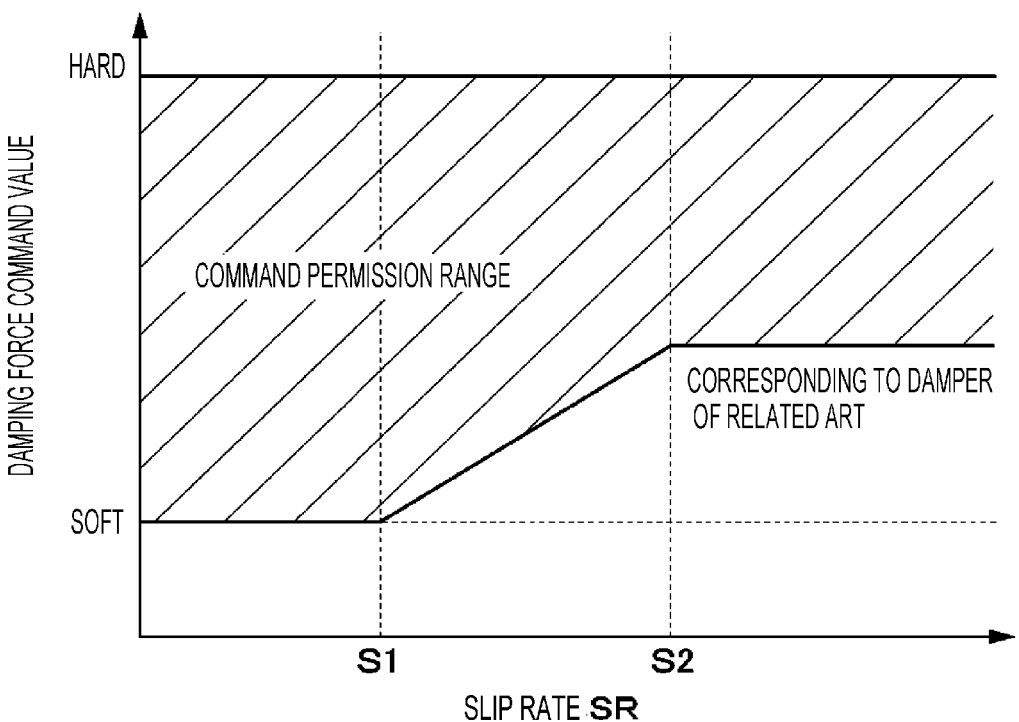
FIG. 24 is a diagram illustrating a relationship between a slip ratio and a command permission range according to a third modification.

24, when the slip ratio SR is equal to or larger than the second threshold value S2, the command permission range (the variable range of damping force) may be limited to a predetermined range set in advance to be a narrower range than when it is smaller than the second threshold value S2. In this case, as in a second modification illustrated in FIG. 23, the command permission range may be limited to a range where the damping force is, for example, between the damping force of the damper in the related art and the damping force of the soft characteristic. As in a third modification illustrated in FIG. 24, the command permission range may be limited to a range where the damping force is, for example, between the damping force of the damper in the related art and the damping force of the hard characteristic. The predetermined range in which the command permission range is limited is appropriately set by tuning. This configuration may also be applied to the second and third embodiments.

In the first and fourth embodiments, the command limiting units 16 and 41 limit the command permission range (variable range) of the damping force based on the slip ratio SR. Also, when the braking/driving force control flag (control flag) for independently braking and driving all wheels of the vehicle including the wheels is acquired, the command limiting units 16 and 41 limit the command permission range (variable range) of the damping force to be narrower than the variable range of the damping force when it is smaller than the second threshold value S2. Without being limited thereto, the command limiting units may limit the command permission range (variable range) of the damping force based only on the slip ratio SR without limiting the variable range of the damping force based on the control flag. This configuration may also be applied to the second and third embodiments.

In the first embodiment, the controller 11 includes a planar VSE 14, a steering stability control logic 15, and a control command selection unit 17, but these elements may be omitted. In this case, the controller 11 outputs the command value limited by the command limiting unit 16. This configuration may also be applied to the second to fourth embodiments.

In each of the above embodiments, the braking/driving force control flag is set to "ON" when the ABS, TCS, and ESC are operated. Without being limited thereto, for example, during the operation of G-Vectoring control that controls the acceleration/deceleration of the vehicle according to the lateral acceleration of the vehicle, during the operation of Moment+ control that controls the yaw moment according to the lateral acceleration of the vehicle, or during the operation that controls the pitch of the vehicle body by controlling the engine torque, the braking/driving force control flag may be set to "ON" when the braking/driving force control of each wheel is controlled by a system rather than the driver's operation.

In each of the above-described embodiments, the case where the controller 11 is configured to output the obtained control command to the suspension device 5 has been described as an example. Without being limited thereto, for example, a control device (ECU) different from the vehicle control device may be provided between the vehicle control device as a controller and the damping force generating device as a suspension device. In this case, the vehicle control device outputs the obtained control command to the damping force generation device via the other control device (ECU).

In each of the above-described embodiments, the case where the controller 11 acquires the specifications related to the traveling of the vehicle through the CAN 10 has been described as an example. Without being limited thereto, the controller may acquire specifications related to the traveling of the vehicle from, for example, a wheel speed sensor, an acceleration sensor, and another controller.

The specific numerical values described in each of the above embodiments indicate an example and are not limited to the exemplified values.

Each of the above embodiments is exemplary and allows a partial substitution or combination of the configurations described in different embodiments.

For example, the aspects described below may be considered as the vehicle control device, the vehicle control method, and the vehicle control system based on the embodiments described above.

A first aspect of the present disclosure is a vehicle control device including a control unit that performs a calculation based on input information and outputs a calculation result. The control unit acquires specifications related to the traveling of the vehicle, limits the variable range of the damping force generated by a damping force generating device provided between the vehicle body and the wheels of the vehicle based on the acquired specifications related to the traveling of the vehicle to obtain a damping force control command, and outputs the obtained damping force control command.

As a second aspect, the control unit in the first aspect limits the variable range of the damping force based on the slip ratio of the wheel among the specifications related to the traveling of the vehicle.

As a third aspect, when the slip ratio is smaller than a preset first threshold value, the control unit in the second aspect does not limit the variable range of the damping force. When the slip ratio is larger than the first threshold value and smaller than a second threshold value larger than the first threshold value, the control unit limits the variable range of the damping force so that the variable range of the damping force becomes narrower as the slip ratio increases. When the slip ratio is larger than the second threshold value, the control unit limits the variable range of the damping force to be narrower than the variable range of the damping force when it is smaller than the second threshold value.

As a fourth aspect, when a control flag for independently braking and driving all wheels of the vehicle including the wheels is acquired among the specifications related to the traveling of the vehicle, the control unit in the third aspect limits the variable range of the damping force to be narrower than the variable range of the damping force when it is smaller than the second threshold value.

As a fifth aspect, when the slip ratio is larger than the second threshold, the control unit in the third aspect sets the variable range of the damping force to a preset predetermined value.

As a sixth aspect, when the slip ratio is larger than the second threshold value, the control unit in the third aspect sets the variable range of the damping force to a preset predetermined value.

As a seventh aspect, the control unit in the first aspect limits the variable range of the damping force based on the front/rear acceleration of the vehicle among the specifications related to the traveling of the vehicle.

As an eighth aspect, the control unit in the seventh aspect changes a threshold value for changing the limit of the variable range of the damping force based on the road surface friction coefficient on the road surface on which the vehicle travels.

As a ninth aspect, the control unit in the first aspect limits the variable range of the damping force based on the brake/drive torque applied to the wheels among the specifications related to the traveling of the vehicle.

A tenth aspect of the present disclosure is a vehicle control method that includes acquiring specifications related to the traveling of the vehicle, limiting the variable range of the damping force generated by a damping force generating device provided between the vehicle body and the wheels of the vehicle based on the acquired specifications related to the traveling of the vehicle to obtain a damping force control command, and outputting the obtained damping force control command.

An eleventh aspect of the present disclosure is a vehicle control system that includes a damping force generating device provided between the vehicle body and the wheels of the vehicle, and a controller that acquires specifications related to the traveling of the vehicle, limits the variable range of the damping force generated by the damping force generating device based on the acquired specifications related to the traveling of the vehicle to obtain a damping force control command, and outputs the obtained damping force control command.

DESCRIPTION OF SYMBOLS

1: vehicle control system
2: vehicle body
3: wheel
4: tire
5: suspension device (damping force generating device)
6: suspension spring (spring)
7: variable damper
8: damping force variable actuator
10: CAN
11: controller (vehicle control device)
12: vertical VSE
13: riding comfort control logic
14: planar VSE
15: steering stability control logic
16, 21, 31, 41: command limiting unit (control unit)
17: control command selection unit

What is claimed is:

1. A vehicle control device comprising a controller configured to perform a calculation based on input information and output a calculation result,
wherein the controller is configured to:
acquire specifications related to a traveling of a vehicle,
based on the acquired specifications related to the traveling of the vehicle, limit a variable range of a damping force generated by a damping force generator provided between a vehicle body and a wheel of the vehicle, thereby obtaining a damping force control command, and
output the obtained damping force control command, and
wherein the controller limits the variable range of the damping force based on a slip ratio of the wheel among the specifications related to the traveling of the vehicle,
when the slip ratio is smaller than a first threshold value set in advance, the controller does not limit the variable range of the damping force,
when the slip ratio is equal to or larger than the first threshold value and smaller than a second threshold value larger than the first threshold value, the controller limits the variable range of the damping force to be narrower as the slip ratio increases, and
when the slip ratio is equal to or larger than the second threshold value, the controller limits the variable range of the damping force to be narrower than the variable range of the damping force when the slip ratio is smaller than the second threshold value.

2. The vehicle control device according to claim 1, wherein when a control flag for independently braking and driving all wheels of the vehicle including the wheel is acquired among the specifications related to the traveling of the vehicle, the controller limits the variable range of the damping force to be narrower than the variable range of the damping force when the slip ratio is smaller than the second threshold value.

3. The vehicle control device according to claim 1, wherein when the slip ratio is equal to or larger than the second threshold value, the controller sets the variable range of the damping force to a predetermined value set in advance.

4. The vehicle control device according to claim 1, wherein when the slip ratio is equal to or larger than the second threshold value, the controller sets the variable range of the damping force to a predetermined value set in advance.

5. The vehicle control device according to claim 1, wherein the controller limits the variable range of the damping force based on a front/rear acceleration of the vehicle among the specifications related to the traveling of the vehicle.

6. The vehicle control device according to claim 5, wherein the controller changes a threshold value for changing the limit of the variable range of the damping force based on a road surface friction coefficient on a road surface on which the vehicle travels.

7. The vehicle control device according to claim 1, wherein the controller limits the variable range of the damping force based on a brake/drive torque applied to the wheel among the specifications related to the traveling of the vehicle.

8. A vehicle control method comprising:
acquiring specifications related to a traveling of a vehicle;
based on the acquired specifications related to the traveling of the vehicle, limiting a variable range of a damping force generated by a damping force generator provided between a vehicle body and a wheel of the vehicle, thereby obtaining a damping force control command;
outputting the obtained damping force control command;
limiting the variable range of the damping force based on a slip ratio of the wheel among the specifications related to the traveling of the vehicle;
when the slip ratio is smaller than a first threshold value set in advance, not limiting the variable range of the damping force;
when the slip ratio is equal to or larger than the first threshold value and smaller than a second threshold value larger than the first threshold value, limiting the variable range of the damping force to be narrower as the slip ratio increases; and
when the slip ratio is equal to or larger than the second threshold, limiting the variable range of the damping force to be narrower than the variable range of the damping force when the slip ratio is smaller than the second threshold value.

9. A vehicle control system comprising:
a damping force generator provided between a vehicle body and a wheel of a vehicle; and
a controller configured to:

acquire specifications related to a traveling of the vehicle, limit a variable range of a damping force generated by the damping force generator based on the acquired specifications related to the traveling of the vehicle, thereby obtaining a damping force control command, and output the obtained damping force control command, wherein the controller limits the variable range of the damping force based on a slip ratio of the wheel among the specifications related to the traveling of the vehicle, when the slip ratio is smaller than a first threshold value set in advance, the controller does not limit the variable range of the damping force, when the slip ratio is equal to or larger than the first threshold value and smaller than a second threshold value larger than the first threshold value, the controller limits the variable range of the damping force to be narrower as the slip ratio increases, and when the slip ratio is equal to or larger than the second threshold value, the controller limits the variable range of the damping force to be narrower than the variable range of the damping force when the slip ratio is smaller than the second threshold value.

* * * * *